United States Patent
Shinto et al.

(10) Patent No.: US 11,307,478 B2
(45) Date of Patent: Apr. 19, 2022

(54) WAVELENGTH TUNABLE OPTICAL FILTER, OPTICAL MODULE, AND ELECTRONIC APPARATUS

(71) Applicant: Seiko Epson Corporation, Tokyo (JP)

(72) Inventors: Susumu Shinto, Shiojiri (JP); Akira Sano, Matsumoto (JP); Teruyuki Nishimura, Matsumoto (JP)

(73) Assignee: Seiko Epson Corporation

( * ) Notice: Subject to any disclaimer, the term of this patent is extended or adjusted under 35 U.S.C. 154(b) by 55 days.

(21) Appl. No.: 16/117,380

(22) Filed: Aug. 30, 2018

(65) Prior Publication Data

US 2019/0064628 A1 Feb. 28, 2019

(30) Foreign Application Priority Data

Aug. 31, 2017 (JP) .............................. JP2017-166545

(51) Int. Cl.
| | | |
|---|---|---|
| *G02F 1/21* | (2006.01) | |
| *G01J 3/26* | (2006.01) | |
| *G01J 3/32* | (2006.01) | |
| *G01J 3/50* | (2006.01) | |
| *G01J 3/42* | (2006.01) | |
| *G02B 26/00* | (2006.01) | |

(52) U.S. Cl.
CPC .................. *G02F 1/21* (2013.01); *G01J 3/26* (2013.01); *G01J 3/32* (2013.01); *G01J 3/42* (2013.01); *G01J 3/50* (2013.01); *G02B 26/001* (2013.01); *G02F 1/213* (2021.01)

(58) Field of Classification Search
CPC ........................................................ G02F 1/21
See application file for complete search history.

(56) References Cited

U.S. PATENT DOCUMENTS

| | | |
|---|---|---|
| 5,561,523 A | 10/1996 | Blomberg et al. |
| 2012/0044491 A1 | 2/2012 | Urushidani et al. |
| 2012/0050751 A1 | 3/2012 | Blomberg |
| 2013/0214123 A1 | 8/2013 | Shinto |
| 2014/0240836 A1 | 8/2014 | Shinto et al. |

FOREIGN PATENT DOCUMENTS

| | | |
|---|---|---|
| JP | H07-286809 A | 10/1995 |
| JP | 2009-210312 A | 9/2009 |
| JP | 2012-042584 A | 3/2012 |
| JP | 2012-173315 A | 9/2012 |
| JP | 2012-528345 A | 11/2012 |
| JP | 2013-167789 A | 8/2013 |
| JP | 2014-164019 A | 9/2014 |
| JP | 2015-031854 A | 2/2015 |
| JP | 2015-049276 A | 3/2015 |
| JP | 2015-165266 A | 9/2015 |
| JP | 2017-083680 A | 5/2017 |

*Primary Examiner* — Christopher Stanford
*Assistant Examiner* — Journey F Sumlar
(74) *Attorney, Agent, or Firm* — Harness, Dickey & Pierce, P.L.C.

(57) ABSTRACT

An optical filter includes a substrate, a first reflective film provided on the substrate, a second reflective film disposed to face the first reflective film, and a supporting portion provided on the substrate and supporting the second reflective film. The first reflective film is protected with a first protective film so as not to be exposed and the second reflective film is protected with a second protective film so as not to be exposed.

20 Claims, 21 Drawing Sheets

WAVELENGTH TUNABLE OPTICAL FILTER, OPTICAL MODULE, AND ELECTRONIC APPARATUS

BACKGROUND

1. Technical Field

The present invention relates to a wavelength tunable optical filter, an optical module, and an electronic apparatus.

2. Related Art

In the related art, an optical filter for selecting and passing light having a specific wavelength out of incident light is utilized. The optical filter for passing light having a specific wavelength is disclosed in JP-T-2012-528345. According to JP-T-2012-528345, the optical filter has a first reflective film provided on one substrate. Furthermore, a second reflective film is provided via a supporting portion. A space is disposed between a second reflective film and a substrate. The first reflective film and the second reflective film are provided on a single substrate with a supporting portion interposed therebetween. This type of tunable optical filter is called a monolithic-structured wavelength tunable optical filter.

Electrodes are respectively provided on the first reflective film and the second reflective film. Electrostatic force is generated between the electrodes by applying a voltage between the electrodes. Then, an actuator that changes the distance between the electrodes due to deformation of the second reflection film by the electrostatic force. A gap between a pair of opposing reflective films is controlled by the actuator. In the optical filter, it is possible to selectively extract light having a wavelength corresponding to the gap between the pair of reflective films. Accordingly, the optical filter is a tunable interference filter.

In the wavelength tunable optical filter described in JP-T-2012-528345, each of the first reflective film and the second reflective film has a multilayer structure, and in each multilayer structure, a silicon layer and a silicon nitride layer are alternately laminated. In a mirror of this structure, a spectral band is narrow and all visible light band cannot be spectrally separated. In order to disperse all visible light bands, the mirror can be realized by using metal for the mirror. However, the metal reacts with gas such as oxygen to degrade optical characteristics. Accordingly, a wavelength tunable optical filter capable of suppressing degradation of optical characteristics is desired.

SUMMARY

An advantage of some aspects of the invention is to solve at least a part of the problems described above, and the invention can be implemented as the following forms or application examples.

Application Example 1

A wavelength tunable optical filter according to this application example includes a substrate, a first reflective film provided on the substrate, a second reflective film disposed to face the first reflective film, and a supporting portion provided on the substrate and supporting the second reflective film, and in which the first reflective film is protected with a first protective film so as not to be exposed and the second reflective film is protected with a second protective film so as not to be exposed.

According to this application example, the wavelength tunable optical filter includes the substrate, and the first reflective film is provided on the substrate. Furthermore, the supporting portion is provided on the substrate, and the supporting portion supports the second reflective film. The first reflective film and the second reflective film are disposed to face each other. When light is incident between the first reflective film and the second reflective film, light is repeatedly reflected between the first reflective film and the second reflective film. Only light of which an integer multiple of a half wavelength corresponds to a distance between the first reflective film and the second reflective film passes through the first reflective film or the second reflective film. Accordingly, the wavelength tunable optical filter functions as an optical filter for limiting and passing only light having a predetermined wavelength.

When a material that semi-transmits light in a visible light region to the first reflective film and the second reflective film is selected, the wavelength tunable optical filter may limit and pass only light having a predetermined wavelength among light in the visible light region. When the material that semi-transmits light in the visible light region reacts with gas such as oxygen, optical characteristics change. In this case, the optical characteristics of the first reflective film and the second reflective film change. Since the first reflective film is protected (covered) with a first reflective film so as not to be exposed and the second reflective film is protected (covered) with a second protective film so as not to be exposed, the first reflective film and the second reflective film are inhibited from reacting with gas such as oxygen. Accordingly, the wavelength variable optical filter may suppress degradation of the optical characteristics.

Application Example 2

In the wavelength tunable optical filter according to the application example, the first reflective film and the second reflective film are metal films.

According to this application example, the first reflective film and the second reflective film are metal films. Reflectance of the metal film in the visible light region is high. Accordingly, the wavelength variable optical filter may be used as an optical filter used in the visible light region.

Application Example 3

In the wavelength tunable optical filter according to the application example, each of the first reflective film and the second reflective film is an Ag film or an Ag alloy film.

According to this application example, each of the first reflective film and the second reflective film is the Ag film or the Ag alloy film. The Ag film or the Ag alloy film has high reflectance in the visible light region, even among the metal films. Accordingly, setting of reflectance and the transmittance of the first reflective film and the second reflective film may be selected over a wide range with respect to light in the visible light region.

Application Example 4

In the wavelength tunable optical filter according to the application example, the protective film is a conductive film.

According to this application example, the protective film is a conductive film. Accordingly, the first reflective film and the second reflective film may be energized through the protective film. As a result, an electric capacitance between the first reflective film and the second reflective film may be measured using a wiring provided in the first reflective film and the second reflective film. Otherwise, a voltage may be applied between the first reflective film and the second reflective film by using the wiring.

Application Example 5

In the wavelength tunable optical filter according to the application example, the protection film transmits light.

According to this application example, the first protective film and second protective film are films having optical transparency. Since the protective film has optical transparency, attenuation of intensity of light may be suppressed by allowing light to pass through the protective film.

Application Example 6

In the wavelength tunable optical filter according to the application example, a shape maintaining film overlapping to the second reflective film.

According to this application example, the shape maintaining film is provided so as to overlap the second reflective film. A thickness of the second reflective film is set from the optical characteristics of the second reflective film. When the second reflective film is thin, the second reflective film is easily deformed. In this case, by providing the shape maintaining film to overlap the second reflective film, it is possible to adjust a spring constant of the second reflective film and the shape maintaining film.

Application Example 7

In the wavelength tunable optical filter according to the application example, a through-hole penetrating the second reflective film is included, and a surface of the through-hole is protected with the protective film so as not to be exposed.

According to this application example, the through-hole is provided in the second reflective film. The surface of the through-hole is protected (covered) with the protective film. Accordingly, it is possible to suppress reaction of the second reflective film with gas such as oxygen in the through-hole.

Application Example 8

In the wavelength tunable optical filter according to the application example, a thickness of each of the first reflective film and the second reflective film is 10 nm or more and 80 nm or less.

According to this application example, the thickness of each of the first reflective film and the second reflective film is 10 nm or more. In this case, the film quality of the first reflective film and the second reflective film is good. The thickness of each of the first reflective film and the second reflective film is 80 nm or less. In this case, the first reflective film and the second reflective film may semi-transmit visible light.

Application Example 9

In the wavelength tunable optical filter according to the application example, a material of the supporting portion is silicon oxide or a resin material.

According to this application example, the material of the supporting portion is silicon oxide or a resin material. When the wavelength tunable optical filter is manufactured, the same material as the supporting portion is disposed between the first reflective film and the second reflective film. Then, by removing silicon oxide or the resin material between the first reflective film and the second reflective film using etching gas, a shape of the supporting portion may be formed. Accordingly, a space may be provided between the first reflective film and the second reflective film.

Application Example 10

In the wavelength tunable optical filter according to the application example, an actuator having a first electrode provided on the substrate and a second electrode supported by the supporting portion is included, and the first reflective film also functions as the first electrode and the second reflective film also functions as the second electrode.

According to this application example, the first electrode is provided on the substrate. Then, the second electrode is supported by the supporting portion. When a voltage is applied between the first electrode and the second electrode, electrostatic force acts between the first electrode and the second electrode and a distance between the first electrode and the second electrode changes. Accordingly, the first electrode and the second electrode serve as actuators controlled by a voltage.

The first reflective film also functions as the first electrode and the second reflective film also serves as the second electrode. Accordingly, when a voltage is applied between the first reflective film and the second reflective film, electrostatic force acts between the first reflective film and the second reflective film and a distance between the first reflective film and the second reflective film changes.

Compared to a structure in which the first reflective film and the first electrode are provided on the substrate and the second reflective film and the second electrode are separately provided, the wavelength tunable light filter of this application example may have a simple structure. Accordingly, the wavelength tunable optical filter may be manufactured with good productivity.

Application Example 11

In the wavelength tunable optical filter according to the application example, an actuator having a first electrode provided on the substrate and a second electrode supported by the supporting portion is included, when the distance between the first reflective film and the second reflective film is defined as an inter-reflective film di stance and the distance between the first electrode and the second electrode is defined as an inter-electrode distance, the inter-electrode distance is longer than the inter-reflective film distance.

According to this application example, the first electrode is provided on the substrate. Then, the second electrode is supported by the supporting portion. When a voltage is applied between the first electrode and the second electrode, electrostatic force acts between the first electrode and the second electrode and the distance between the first electrode and the second electrode changes. Accordingly, the first electrode and the second electrode serve as the actuators controlled by voltage.

The distance between the first reflective film and the second reflective film is the inter-reflective film distance. The distance between the first electrode and the second electrode is the inter-electrode distance. The inter-electrode distance is longer than the inter-reflective film distance. The inter-reflective film distance is a distance which is set corresponding to a wavelength that the wavelength tunable optical filter passes. It is possible to lengthen the distance for changing the distance between the electrodes in a case where the inter-electrode distance is the longer than the inter-reflective film distance than a case where the inter-electrode distance is the same as the inter-reflective film distance. As a result, it is possible to widen a selection range of a wavelength of light to be transmitted.

Application Example 12

In the wavelength tunable optical filter according to the application example, the second reflective film is connected to the second electrode, the first reflective film is separated from the first electrode, a voltage between the first electrode and the second electrode is controlled, and an electric capacitance between the first reflective film and the second reflective film is measured.

According to this application example, the second reflective film and the second electrode are connected to each other. The first reflective film and the first electrode are separated from each other. By controlling the voltage between the first electrode and the second electrode, the distance between the first electrode and the second electrode may be controlled. The distance between the first reflective film and the second reflective film is highly correlated with the distance between the first electrode and the second electrode. Accordingly, the distance between the first reflective film and the second reflective film may be controlled. Then, by measuring the electric capacitance between the first reflective film and the second reflective film, the distance between the first reflective film and the second reflective film may be measured. Accordingly, by measuring the distance between the first reflective film and the second reflective film and controlling the voltage between the first electrode and the second electrode, the distance between the first reflecting film and the second reflecting film may be controlled to be a target distance.

Application Example 13

An optical module according to this application example includes the wavelength tunable optical filter described above and a casing having an internal space and accommodating the wavelength tunable optical filter in the internal space.

According to this application example, the optical module includes the wavelength tunable optical filter and the casing. Then, the wavelength variable optical filter may suppress degradation of optical characteristics. Accordingly, the optical module may suppress degradation of optical characteristics.

Application Example 14

An electronic apparatus according to this application example includes the optical module described above and a control unit that controls the optical module.

According to this application example, the electronic apparatus includes the optical module and the control unit that controls the optical module. The control unit controls the optical module to control a wavelength of light that the optical module passes. The optical module is a module capable of suppressing degradation of optical characteristics. Accordingly, the electronic apparatus may be an apparatus including the module capable of suppressing degradation of optical characteristics.

BRIEF DESCRIPTION OF THE DRAWINGS

The invention will be described with reference to the accompanying drawings, wherein like numbers reference like elements.

Figure 1:
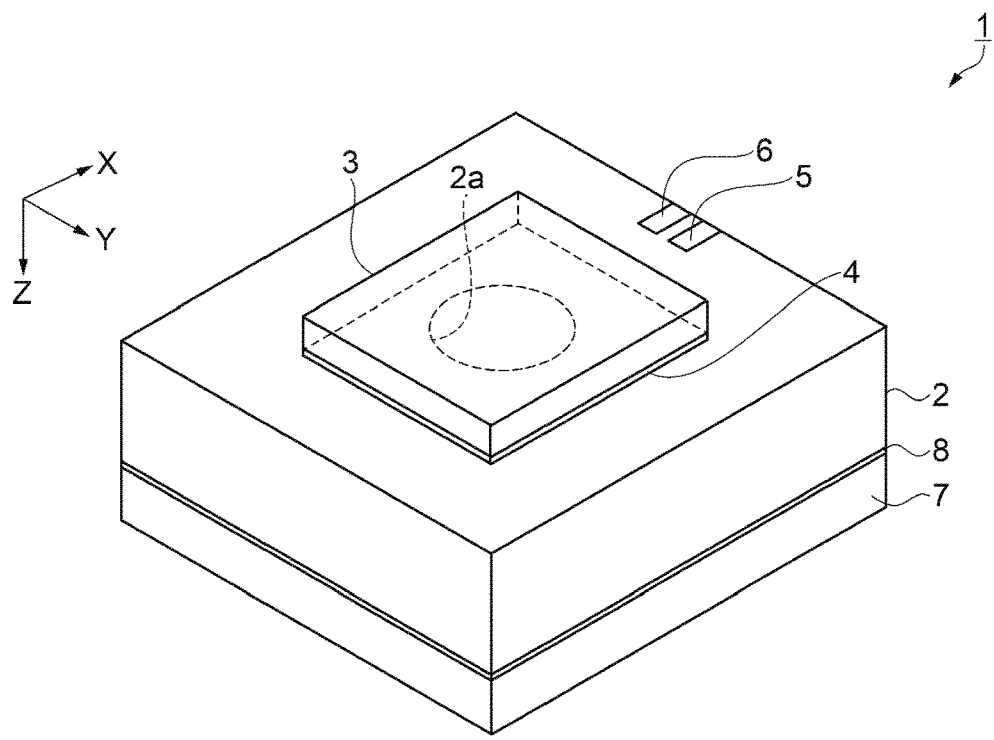
FIG. 1 is a schematic perspective view illustrating a structure of an optical module according to a first embodiment.

Embodiments according to the invention will be explained below with reference to the drawings. Respective components in the drawings are illustrated in different scales in order to be shown in sizes recognizable in the respective drawings.

DESCRIPTION OF EXEMPLARY EMBODIMENTS

First Embodiment

Figure 2:
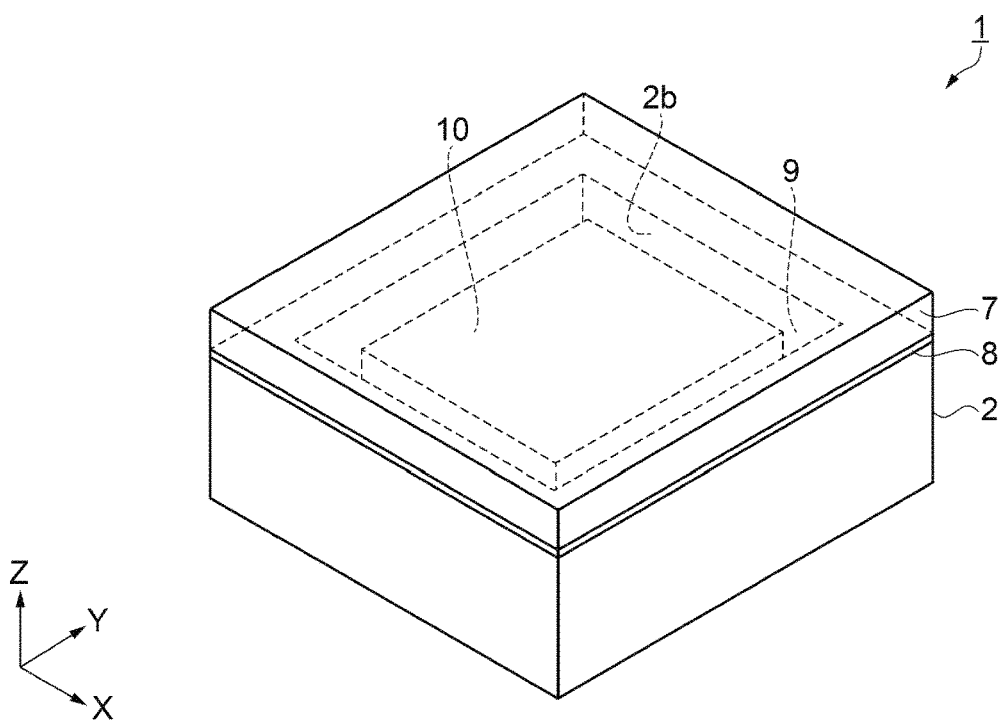
FIG. 2 is another schematic perspective view illustrating the structure of the optical module.

In the first embodiment, an optical module having a characteristic structure, a wavelength tunable optical filter built in the optical module, and a method for manufacturing the wavelength tunable optical filter will be described with reference to the drawings. Description will be made on the optical module with reference to FIGS. 1 and 2. FIGS. 1 and 2 are schematic perspective views illustrating a structure of the optical module. FIG. 1 is a view of the optical module when viewed from a first lid body side and FIG. 2 is view of the optical module when viewed from a second lid body side. As illustrated in FIG. 1, an optical module 1 has a substantially rectangular parallelepiped shape. The downward direction in the drawing of the optical module 1 is the Z-direction, and two directions orthogonal to the Z-direction are the X-direction and Y-direction. The X direction, the Y direction, and the Z direction are directions along the sides of the optical module 1, respectively, and are orthogonal to each other.

The optical module 1 includes a casing 2 with a bottomed square tubular shape, and a circular first hole 2a is formed on the −Z-direction side of the casing 2. Then, a first lid body 3 is provided so as to close the first hole 2a. The casing 2 and the first lid body 3 are joined by a first low melting point glass 4. A first terminal 5 and a second terminal 6 are provided on the surface on the −Z-direction side of the casing 2. A second lid body 7 is provided on the Z-direct ion side of the casing 2, and the casing 2 and the second lid body 7 are joined by a second low melting point glass 8.

The first lid body 3 and the second lid body 7 are formed of silicate glass having optical transparency. As the silicate glass, various kinds of glass such as soda glass, crystalline glass, quartz glass, lead glass, potassium glass, borosilicate glass, non-alkali glass and the like, quartz or the like can be used. The material of the casing 2 is a material having a coefficient of linear expansion close to that of the first lid body 3 and the second lid body 7, and is not particularly limited as long as it has high rigidity. In the first embodiment, for example, ceramic is used as the material of the casing 2.

As illustrated in FIG. 2, a rectangular second hole 2b is formed in the Z-direction of the casing 2. The second hole 2b is a hole larger than the first hole 2a. Then, the second lid body 7 is provided so as to close the second hole 2b. An internal space 9 surrounded by the casing 2, the first lid body 3, and the second lid body 7 is a sealed space, and an optical filter 10 as a wavelength tunable optical filter is provided in the internal space 9. In other words, the casing 2 has the internal space 9 and accommodates the optical filter 10 in the internal space 9. The second lid body 7 is connected to the casing 2 to seal the inner space 9. An accommodating portion is formed by the casing 2, the first lid body 3, the second lid body 7, and the like, and the optical filter 10 is accommodated inside the accommodating portion.

The dimensions of the optical module 1 are not particularly limited, but in the first embodiment, for example, the thickness of the optical module 1 is about 3 mm. The size of the casing 2 viewed from the Z-direction is a quadrangle with one side of about 15 mm. The thickness of the second lid body 7 is about 1 mm. The size of the light filter 10 viewed from the Z-direction is a quadrangle with one side of about 11 mm to 12 mm. The thickness of the optical filter 10 is about 0.7 mm to about 1.5 mm.

Figure 3:
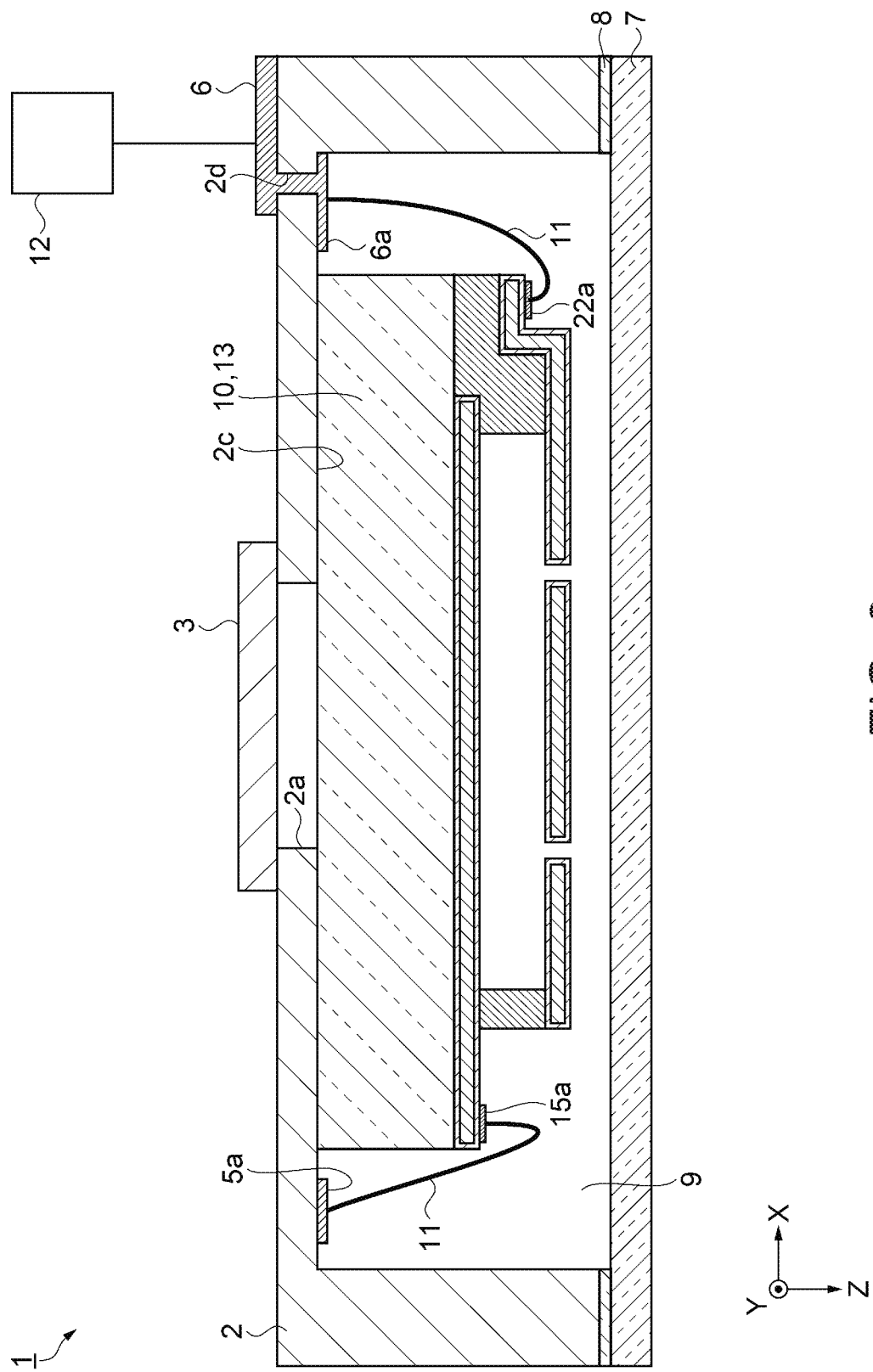
FIG. 3 is a schematic side cross-sectional view illustrating the structure of the optical module.

FIG. 3 is a schematic side cross-sectional view illustrating the structure of the optical module. As illustrated in FIG. 3, the optical filter 10 is provided on a bottom surface 2c of the casing 2. In the casing 2, a first terminal 5 and a second terminal 6 are provided at an end on the +X-direction side. In the casing 2, a first intermediate electrode 5a electrically connected to the first terminal 5 is provided on the bottom surface 2c on the −X-direction side, and a second intermediate electrode 6a electrically connected to the second terminal 6 is provided on the bottom surface 2c on the +X-direction side. The first intermediate electrode 5a and the second intermediate electrode 6a are connected to the optical filter 10 by a gold wire 11.

A through electrode 2d is provided in the casing 2. The first intermediate electrode 5a is connected to the first terminal 5 by the through electrode 2d. Similarly, the second intermediate electrode 6a is connected to the second terminal 6 by the through electrode 2d. The first terminal 5 and the second terminal 6 are electrically connected to a control unit 12. The control unit 12 outputs an electric signal to the optical filter 10 via the first terminal 5 and the second terminal 6 to control the optical filter 10.

Figure 4:
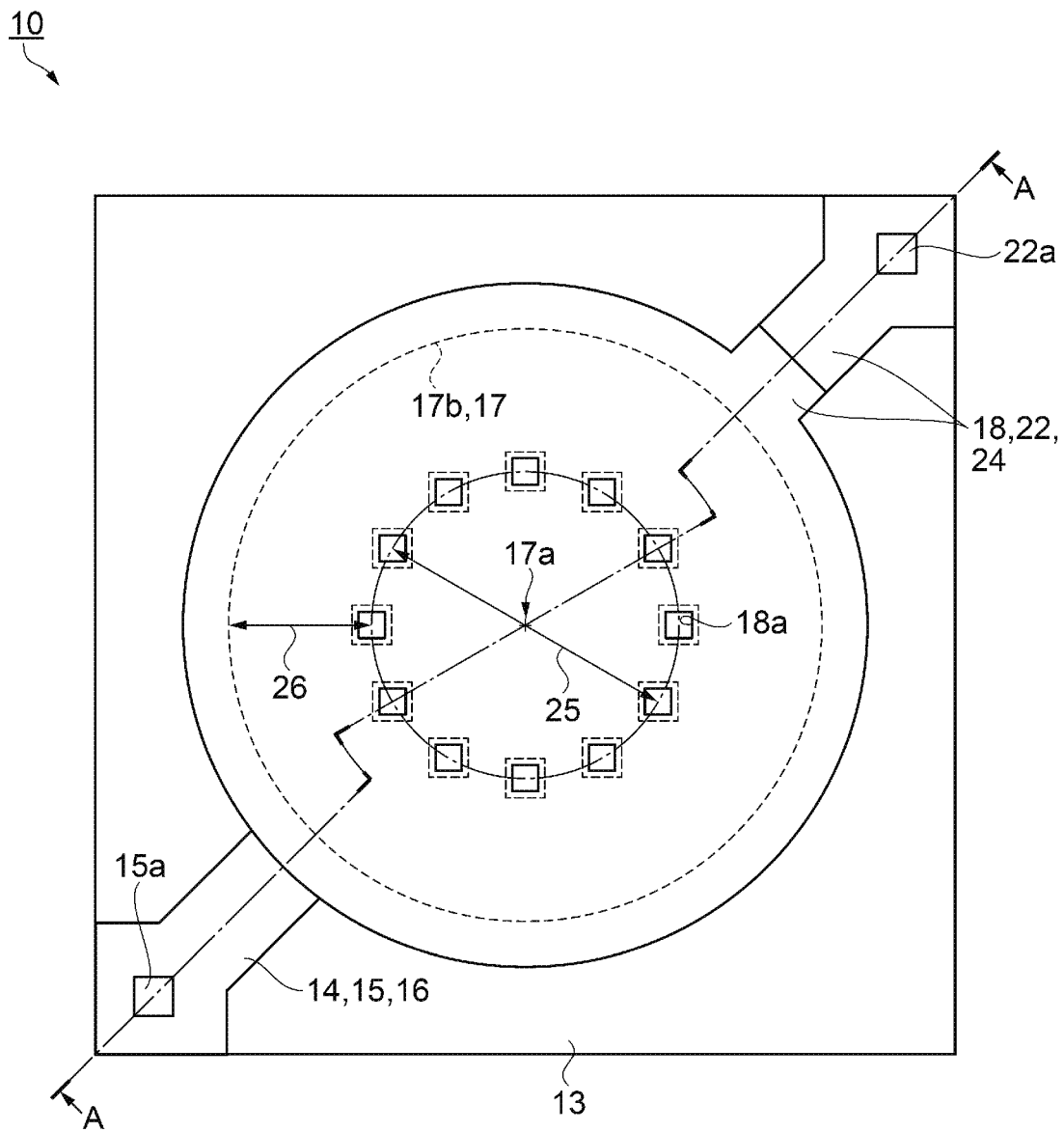
FIG. 4 is a schematic plan view illustrating the structure of the optical filter.
Figure 5:
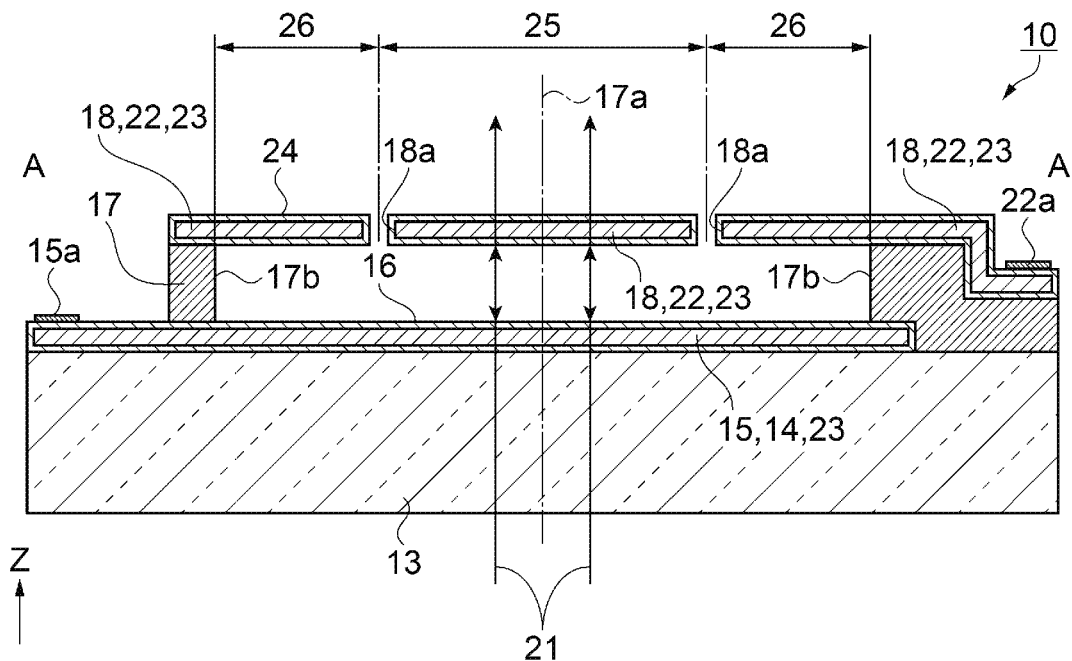
FIG. 5 is another schematic side cross-sectional view illustrating the structure of the optical filter.

FIG. 4 is a schematic plan view illustrating the structure of the optical filter. FIG. 5 is a schematic side cross-sectional view illustrating the structure of the optical filter. FIG. 5 is a view when viewed from the cross-sectional side along line A-A in FIG. 4.

As illustrated in FIGS. 4 and 5, the optical filter 10 includes a substrate 13. The substrate 13 has a rectangular plate shape. The material of the substrate 13 is a material that transmits light, and it is not particularly limited as long as it has strength. Silicate glass is used as the material of the substrate 13. The silicate glass includes various kinds of glass such as soda glass, crystalline glass, quartz glass, lead glass, potassium glass, borosilicate glass, alkali free glass, quartz, and the like. In the first embodiment, for example, silicate glass is adopted as the material of the substrate 13. The substrate 13 is formed by processing a glass base material having a thickness of, for example, 500 μm to 1000 μm.

A first reflective film 14 is provided on the +Z-direction side surface of the substrate 13. The first reflective film 14 has conductivity and also functions as the first electrode 15. The first reflective film 14 is a metal film, and is an Ag film or an Ag alloy film. The first reflective film 14 has a disk shape. The first reflective film 14 extends in the −X-direction and in the −Y-direction.

The first reflective film 14 is covered with a first protection film 16 as a protection film so as not to be exposed. The first protective film 16 is a conductive film. Furthermore, the first protective film 16 has optical transparency. A first electrode terminal 15a is provided on the first reflective film 14 extending in the −X-direction and the −Y-direction side. The first electrode terminal 15a is a terminal connected to the first intermediate electrode 5a by the gold wire 11.

On the first protective film 16, a ring-shaped supporting portion 17 is provided. A center 17a of the supporting portion 17 is located at the same position as the center of the first reflective film 14. The material of the supporting portion 17 is silicon oxide or a resin material.

A second reflective film 18 is provided in the +Z-direction of the supporting portion 17. The supporting portion 17 is provided on the substrate 13 and supports the second reflective film 18. The second reflective film 18 is disposed to face the first reflective film 14. When light 21 is incident between the first reflective film 14 and the second reflective film 18, light 21 is repeatedly reflected between the first reflective film 14 and the second reflective film 18. Then, only light of which an integer multiple of a half wavelength corresponds to the distance between the first reflective film 14 and the second reflective film 18 passes through the first reflective film 14 or the second reflective film 18. Accordingly, the optical filter 10 functions as an optical filter for limiting and passing only light 21 having a predetermined wavelength.

Similar to the first reflective film 14, the second reflective film 18 has conductivity and also functions as a second electrode 22. An actuator 23 is configured with the first electrode 15 provided on the substrate 13, the second electrode 22 supported by the supporting portion 17, and the like. Since the second electrode 22 is thin, the second electrode 22 is easily deformed in the Z-direction. When a voltage is applied between the first electrode 15 and the second electrode 22, electrostatic force acts between the first electrode 15 and the second electrode 22 and the distance between the first electrode 15 and the second electrode 22 changes. Accordingly, the first electrode 15 and the second electrode 22 are actuators 23 controlled by a voltage.

The first reflective film 14 also functions as the first electrode 15 and the second reflective film 18 also functions as the second electrode 22. Accordingly, when a voltage is applied between the first reflective film 14 and the second reflective film 18, electrostatic force acts between the first reflective film 14 and the second reflective film 18 and the distance between the first reflective film 14 and the second reflective film 18 changes. The optical filter 10 can have a simple structure as compared with a structure in which the first reflective film 14 and the first electrode 15 are separately provided on the substrate 13 and the second reflective film 18 and the second electrode 22 are separately provided above the substrate 13. Accordingly, the optical filter 10 can be manufactured with high productivity.

Similar to the first reflective film 14, the second reflective film 18 is a metal film. As the material of the first reflective film 14 and the second reflective film 18, for example, metals such as gold (Au), silver (Ag), copper (Cu), platinum (Pt), aluminum (Al), nickel (Ni), and rhodium (Rh) can be used. Reflectance of the metal film in the visible light region is high. Accordingly, the wavelength variable optical filter can be used as an optical filter used in the visible light region.

Similar to the first reflective film 14, the second reflective film 18 is preferably an Ag film or an Ag alloy film. As the Ag alloy film, for example, an Ag—Sm—Cu alloy film, an Ag—Bi—Nd alloy film, an Ag—C alloy film, or the like can be applied. The Ag film or the Ag alloy film has high reflectance in the visible light region even among metal films. The reflectance of a thin film of Ag having a wavelength of 0.4 μm to 1.0 μm is 94% or more. Accordingly, setting of reflectance and the transmittance of the first reflective film 14 and the second reflective film 18 can be selected over a wide range with respect to light in the visible light region.

The thickness of each of the first reflective film 14 and the second reflective film 18 is 10 nm or more and 80 nm or less. When the thickness of each of the first reflective film 14 and the second reflective film 18 is 10 nm or more, the film can be provided with good quality. The thickness of each of the first reflective film 14 and the second reflective film 18 is 80 nm or less. In this case, the first reflective film 14 and the second reflective film 18 can semi-transmit visible light.

The second reflective film 18 has a disk shape. Then, the second reflective film 18 extends in the +X-direction and the +Y-direction side. Similar to the first reflective film 14, the second reflective film 18 is covered with a second protective film 24 as a protective film so as not to be exposed. When a material that semi-transmits light in the visible light region is selected as the material of the first reflective film 14 and the second reflective film 18, the wavelength tunable optical filter can limit and pass only light having a predetermined wavelength. When the material that semi-transmits light in the visible light region reacts with gas such as oxygen, the optical characteristics change. In this case, the optical characteristics of the first reflective film 14 and the second reflective film 18 change. The first reflective film 14 and the second reflective film 18 are not exposed. Since the first reflective film 14 and the second reflective film 18 are covered with the protective film so as not to be exposed, the first reflective film 14 and the second reflective film 18 are inhibited from reacting with gas such as oxygen. Accordingly, the optical filter 10 can suppress degradation of optical characteristics.

The first protective film 16 and the second protective film 24 are conductive films. Accordingly, it is possible to energize the first reflective film 14 through the first protective film 16. Then, the second reflective film 18 can be energized through the second protection film 24. As a result, it is possible to detect an electric capacitance between the first reflective film 14 and the second reflective film 18 by using the wiring provided in the first reflective film 14 and the second reflective film 18.

The first protective film 16 and the second protective film 24 are films having optical transparency. Since the first protective film 16 and the second protective film 24 have optical transparency, attenuation of intensity of light 21 by allowing light to pass through the first protective film 16 and the second protective film 24 can be suppressed. The first protective film 16 and the second protective film 24 are not particularly limited as long as they are transparent conductive films having optical transparency. Indium Tin oxide (ITO), Indium-zinc oxide (IZO), Zinc oxide (ZnO), Indium-gallium-zinc oxide (IGZO), SnOx (tin oxide), Indium-gallium oxide (IGO), Indium-cerium oxide (ICO) can be used for the first protective film 16 and the second protective film 24. In the first embodiment, for example, an IGO film is used for the first protective film 16 and the second protective film 24.

A second electrode terminal 22a is provided on the second protective film 24. The second electrode terminal 22a is a terminal connected to the second intermediate electrode 6a by the gold wire 11. The material of the first electrode terminal 15a and the second electrode terminal 22a are not particularly limited as long as they can connect the gold wire 11. Aluminum, tungsten, a copper alloy, or the like can be used for the material of the first electrode terminal 15a and the second electrode terminal 22a. In the first embodiment, for example, aluminum is used for the material of the first electrode terminal 15a and the second electrode terminal 22a.

In the second reflective film 18, a through-hole 18a penetrating the second reflective film is provided. A plurality of through-holes 18a are disposed along a circle. Although a planar shape of the through-hole 18a is not particularly limited, the through-hole 18a is, for example, rectangular in the first embodiment. Although the number of the through-holes 18a is also not particularly limited, for example, twelve through-holes 18a are provided in the first embodiment.

A distance between places where the distance between the through-holes 18a is the longest is set as an inter-hole distance 25. The inter-hole distance 25 is equal to the diameter of the circle in which the through-holes 18a are aligned. A distance between the through-hole 18a and an inner wall 17b of the supporting portion 17 is set as an inter-hall wall distance 26. The inter-hall wall distance 26 in each through-hole 18a is the same distance. Then, the inter-hole distance 25 is less than twice the inter-wall distance 26.

A member between the first reflective film 14 and the second reflective film 18 is etched with an etching gas. This etching method is called a hydrofluoric acid (HF) vapor etching method. A portion to be etched is called a sacrificial layer. The etching gas melts the sacrificial layer concentrically from the through-hole 18a and spreads. The etching gas also proceeds to the center side of the sacrificial layer and the supporting portion 17 side at the same speed. The center side of the sacrificial layer indicates the center side of the circle along which the through-hole 18a extends. When the inter-hole distance 25 is twice the inter-hall wall distance 26, if the etching gas reaches the center of the sacrificial layer, the etching gas reaches the inner wall 17b of the supporting portion 17. Accordingly, the sacrificial layer at a place surrounded by the inner wall 17b of the supporting portion 17 can be etched with the etching gas, without leaving a sacrificial layer on the center side.

When the inter-hole distance 25 is shorter than twice the inter-hall wall distance 26, if the etching gas reaches the inner wall 17b of the supporting portion 17, the etching gas exceeds the center of the circle. Accordingly, the sacrificial layer at the place surrounded by the inner wall 17b of the supporting portion 17 can be etched with the etching gas, without leaving a sacrificial layer at the center of the circle. As a result, it is possible to etch all of the sacrificial layer at the place surrounded by the inner wall 17b of the supporting portion 17.

As described above, the material of the supporting portion 17 is silicon oxide or a resin material. When the optical filter 10 is manufactured, the same material as that of the supporting portion 17 is disposed on the sacrificial layer positioned between the first reflective film 14 and the second reflective film 18. The silicon oxide or resin material between the first reflective film 14 and the second reflective film 18 is removed by using the etching gas so as to make it possible to form a shape of the support 17. Accordingly, a space can be provided between the first reflective film 14 and the second reflective film 18.

Figure 6:
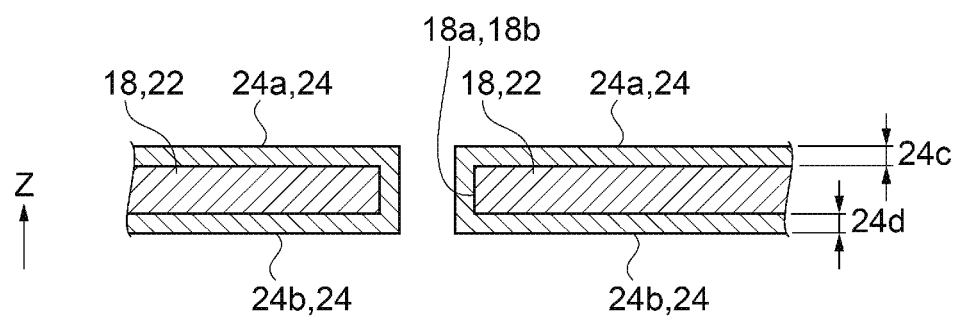
FIG. 6 is a schematic side cross-sectional view of a main portion illustrating a structure of a through-hole.

FIG. 6 is a schematic side cross-sectional view illustrating a structure of a through-hole. As illustrated in FIG. 6, an inner peripheral surface 18b of the through-hole 18a is protected (covered) with the second protective film 24 so as not to be exposed. Accordingly, it is possible to inhibit the second reflective film 18 from reacting with gas such as oxygen in the through-hole 18a.

The second protective film 24 includes an upper second protective film 24a and a lower second protective film 24b. The upper second protective film 24a is a film that covers the +Z-direction side of the second reflective film 18 and the lower second protective film 24b is a film that covers the −Z-direction side of the second reflective film 18. The second upper reflective film 18 is sandwiched between the upper second protective film 24a and the lower second protective film 24b. The upper second protective film 24a and the lower second protective film 24b are made of the same material. An upper thickness 24c which is the thickness of the upper second protective film 24a and a lower thickness 24d which is the thickness of the lower second protective film 24b have the same film thickness. When the coefficient of linear expansion of the second protective film 24 and the coefficient of linear expansion of the second reflective film 18 are different from each other, if heat is applied to the second reflective film 18, tension occurs between the second protective film 24 and the second reflective film 18. In this case, the tension occurring between the upper second protective film 24a and the second reflective film 18 and the tension occurring between the lower second protective film 24b and the second reflective film 18 become the same magnitude. Accordingly, it is possible to inhibit the second reflective film 18 from being warped and deformed when heat is applied to the second reflective film 18. It is possible to suppress generation of Ag hillocks and whiskers by balancing stress of the second reflective film 18.

Figure 7:
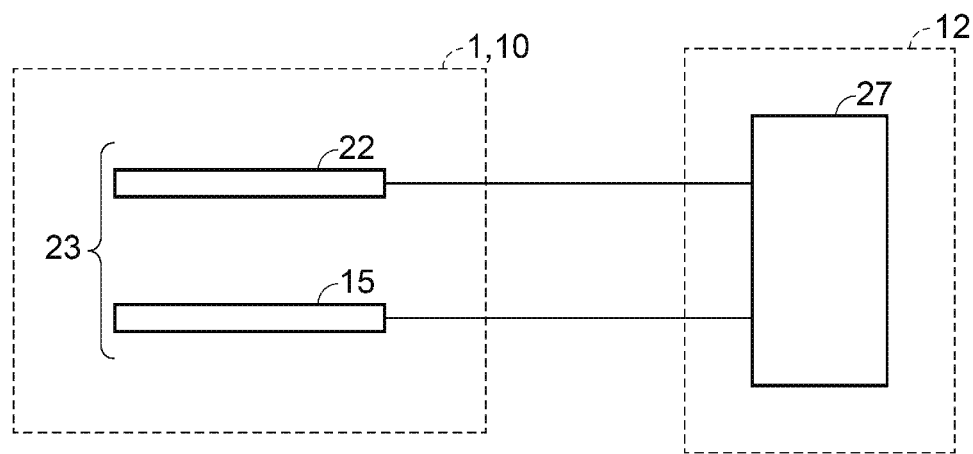
FIG. 7 is an electric control block diagram of a control unit.

FIG. 7 is an electric control block diagram of a control unit. As illustrated in FIG. 7, the optical module 1 is used in connection with the control unit 12. By applying a voltage between the first electrode 15 and the second electrode 22 of the optical filter 10, electrostatic force acts between the first electrode 15 and the second electrode 22. Since the second electrode 22 is a thin film, the second electrode 22 is easily deformed in the Z-direction. The distance between the first reflective film 14 and the second reflective film 18 changes due to the electrostatic force acting between the first electrode 15 and the second electrode 22. The actuator 23 is configured with the first electrode 15, the second electrode 22, and the like. Since the actuator operates with electrostatic force, it is called an electrostatic actuator.

A voltage control unit 27 is provided in a control unit 12, and the first electrode 15 and the second electrode 22 are electrically connected to the voltage control unit 27. The voltage control unit 27 can control the inter-reflective film distance by controlling the voltage to be applied to the first electrode 15 and the second electrode 22. The inter-reflective film distance indicates a distance between the first reflective film 14 and the second reflective film 18 in the Z-direction. The voltage controller 27 changes the inter-reflective film distance to a predetermined interval. Then, light 21 is incident onto the optical filter 10. The light 21 is multiple-reflected between the first reflective film 14 and the second reflective film 18, and light having a wavelength corresponding to the dimension of the inter-reflective film distance passes through the optical filter 10. Accordingly, the voltage control unit 27 controls the inter-reflective film distance, thereby making it possible to control a wavelength of light 21 passing through the optical filter 10.

Figure 8:
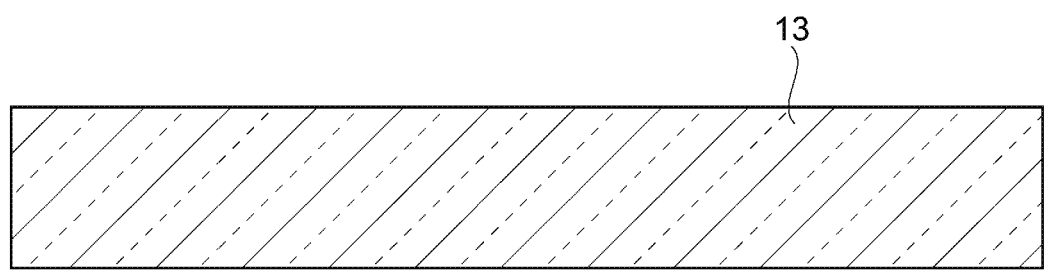
FIG. 8 is a schematic diagram for explaining a manufacturing method of an optical filter.

Next, an example of a method for manufacturing an optical filter will be described. Since the method for manufacturing the optical filter can be performed by various methods, the method is not limited to a method particularly described. FIGS. 8 to 22 are schematic diagrams for explaining the method for manufacturing the optical filter. As illustrated in FIG. 8, a substrate 13 is prepared. The substrate 13 is a glass base material ground and polished to a thickness of, for example, 500 μm to 1000 μm.

Figure 9:
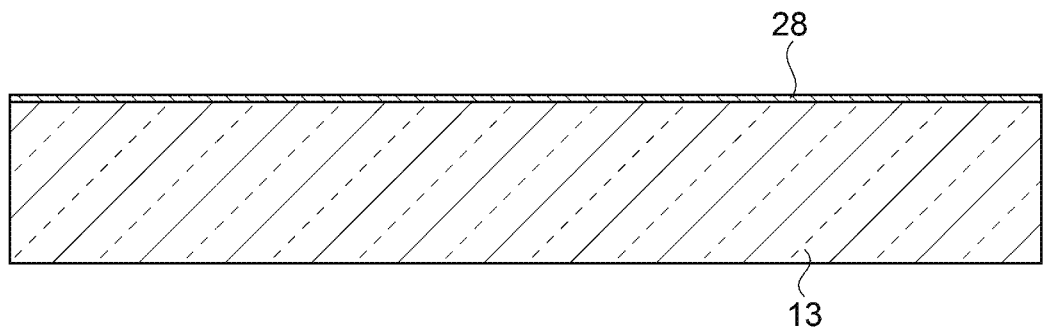
FIG. 9 is another schematic diagram for explaining the manufacturing method of the optical filter.

As illustrated in FIG. 9, a first film 28 which is a film of IGO which is a material of the first protective film 16 is provided on the substrate 13. The first film is a film provided on one surface of the substrate 13. As a method for forming the first film 28 of the IGO, a sputtering method or an atomic layer deposition (ALD) method can be used. In order to increase resistance of the protective film, it is desirable to use the ALD method capable of forming a dense film.

Figure 10:
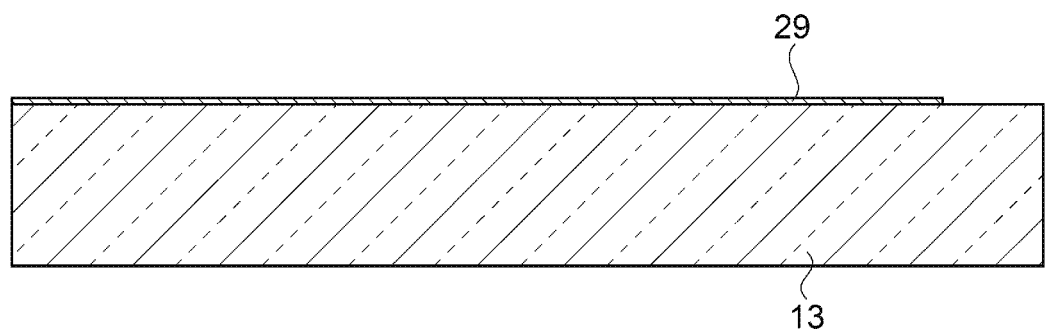
FIG. 10 is another schematic diagram for explaining the manufacturing method of the optical filter.

As illustrated in FIG. 10, the first film 28 is patterned. A photolithography method is used for patterning. Since the photography method is well known, only the outline will be described. A photosensitive resin film is formed and an exposure mask is set to expose the photosensitive resin film. Next, the photosensitive resin film is etched and patterned. Next, the first film of IGO is etched by using the patterned photosensitive resin film as a mask. The etching method may be a dry etching method or a wet etching method. After the etching, the photosensitive resin film is removed. As such, the first film 28 is patterned to form the lower first protective film 29.

Figure 11:
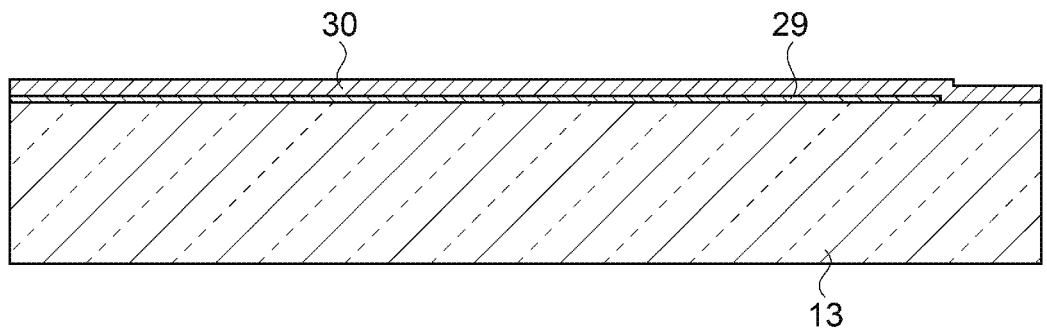
FIG. 11 is another schematic diagram for explaining the manufacturing method of the optical filter.

As illustrated in FIG. 11, a second film 30 which is a film of a silver alloy which is a material of the first reflective film 14 is formed so as to overlap the lower first protective film 29. As a film formation method, a sputtering method or a vapor deposition method can be used. As the material of the second film 30, an Ag—Sm—Cu alloy was adopted.

Figure 12:
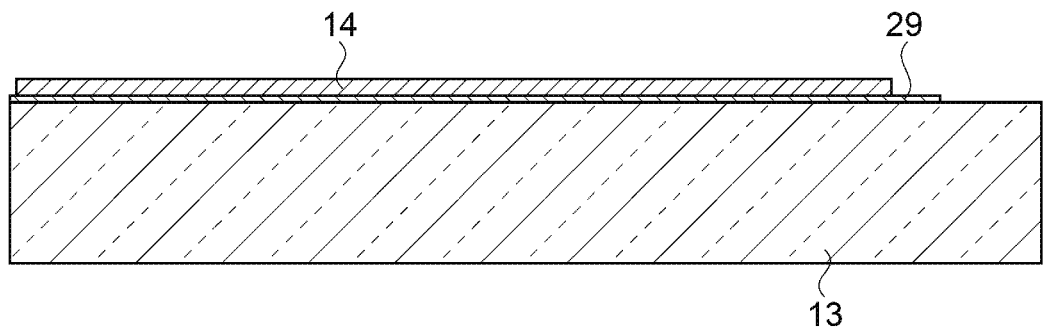
FIG. 12 is another schematic diagram for explaining the manufacturing method of the optical filter.

As illustrated in FIG. 12, the second film 30 is patterned. A photolithography method is used for patterning. The second film 30 is patterned to form the first reflective film 14.

Figure 13:
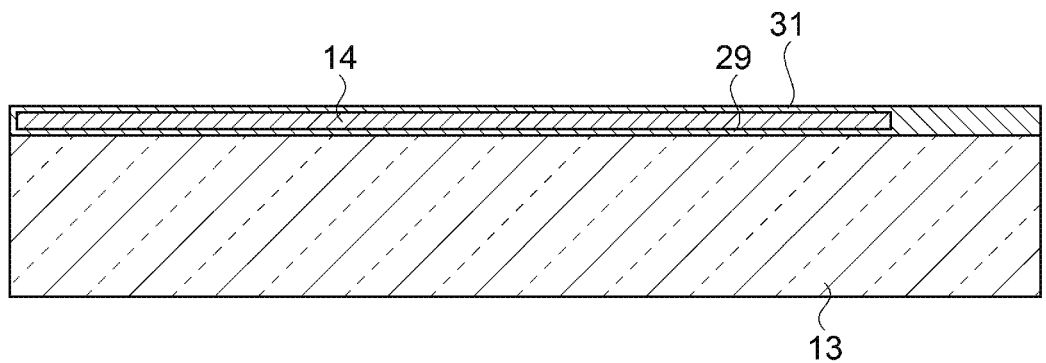
FIG. 13 is another schematic diagram for explaining the manufacturing method of the optical filter.

As illustrated in FIG. 13, a third film 31 which is a film of IGO is provided on the first reflective film 14. The IGO is the material of the first protective film 16. As a method of forming the third film 31, the sputtering method or the ALD method can be used. In order to increase resistance of the protective film, it is desirable to use an ALD method capable of forming a dense film.

Figure 14:
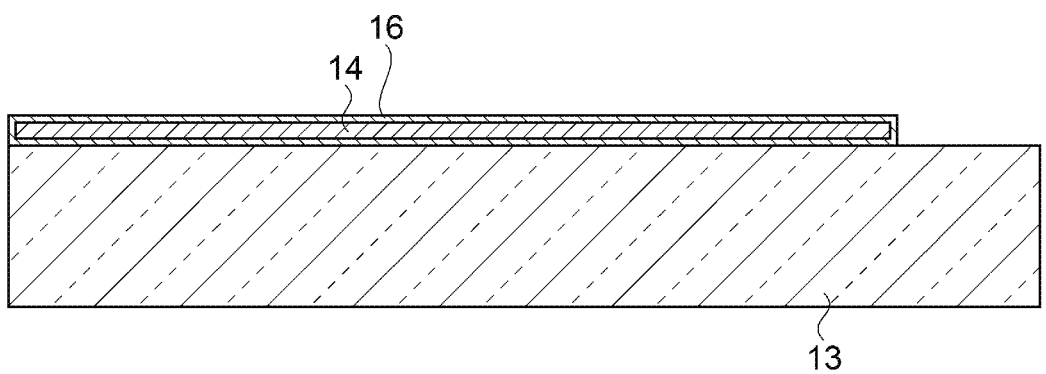
FIG. 14 is another schematic diagram for explaining the manufacturing method of the optical filter.

As illustrated in FIG. 14, the third film 31 is patterned. A photolithography method is used for patterning. The third film 31 is patterned to form the first protective film 16.

Figure 15:
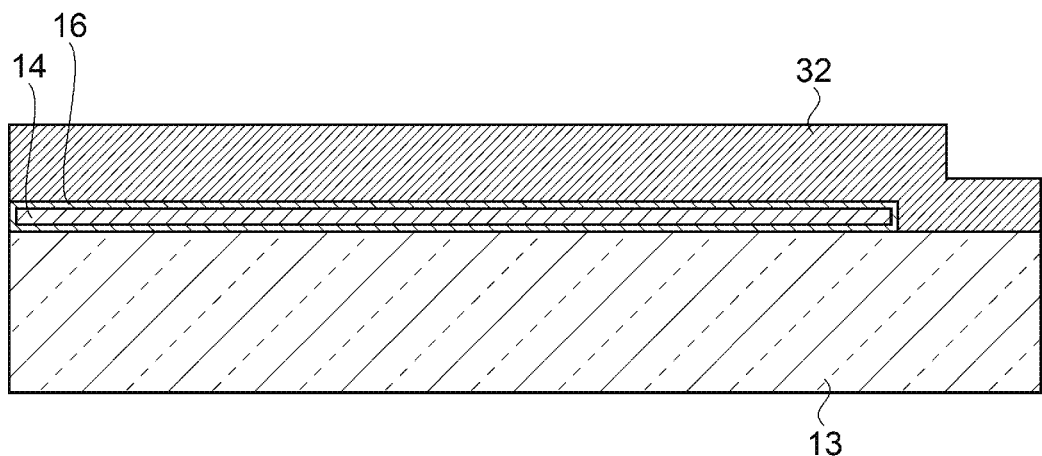
FIG. 15 is another schematic diagram for explaining the manufacturing method of the optical filter.

As illustrated in FIG. 15, a fourth film 32, which is a film of $SiO_2$ which is a material of the supporting portion 17, is formed so as to overlap the first protective film 16. As a film formation method of the fourth film 32, a sputtering method, a vapor deposition method, a CVD method can be used. When a resin material is used as the material of the supporting portion 17, a spin coating method can be used.

Figure 16:
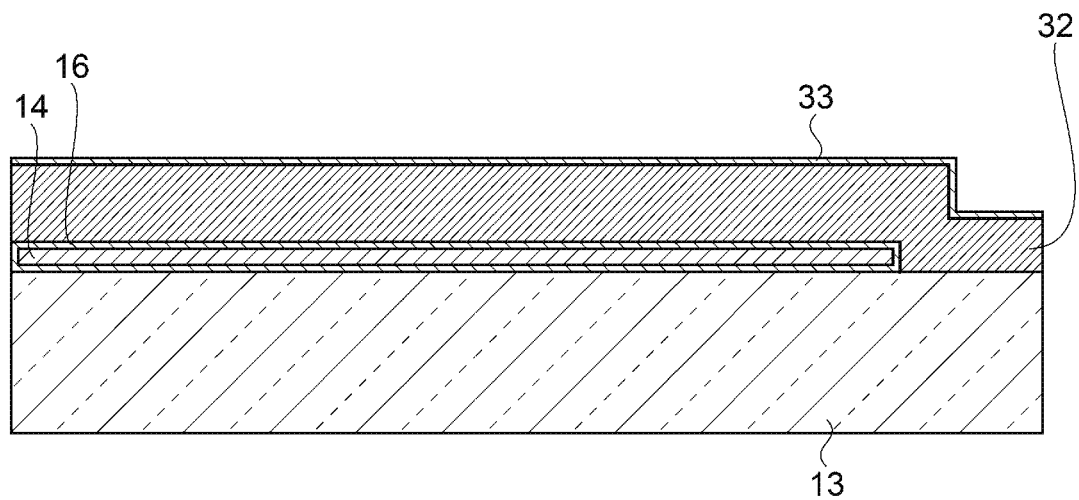
FIG. 16 is another schematic diagram for explaining the manufacturing method of the optical filter.

As illustrated in FIG. 16, a fifth film 33 which is a film of IGO is provided on the fourth film 32. The IGO is the material of the second protective film 24. As a method for forming the fifth film 33, the sputtering method or the ALD method can be used. In order to increase resistance of the protective film, it is desirable to use the ALD method capable of forming a dense film.

Figure 17:
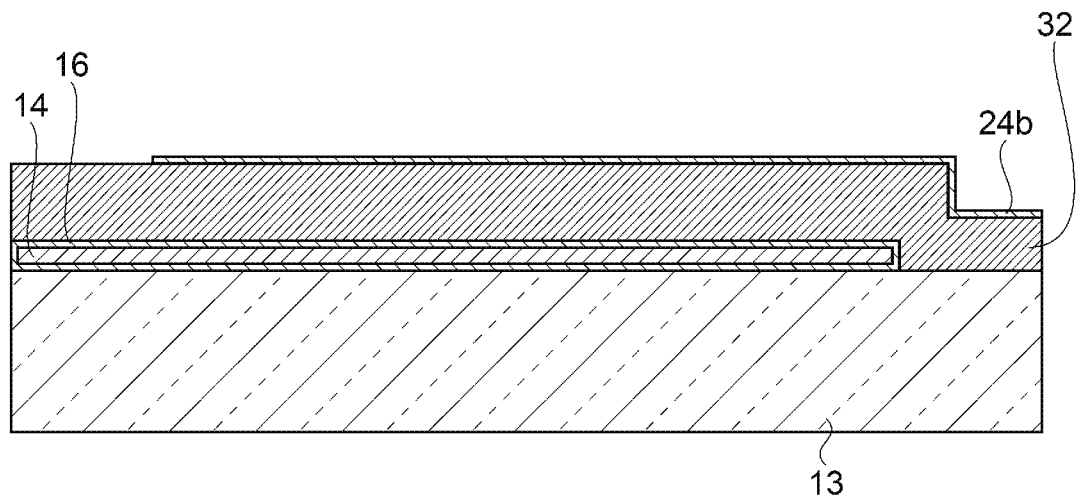
FIG. 17 is another schematic diagram for explaining the manufacturing method of the optical filter.

As illustrated in FIG. 17, the fifth film 33 is patterned. A photolithography method is used for patterning. The fifth film 33 is patterned to form the lower second protective film 24b.

Figure 18:
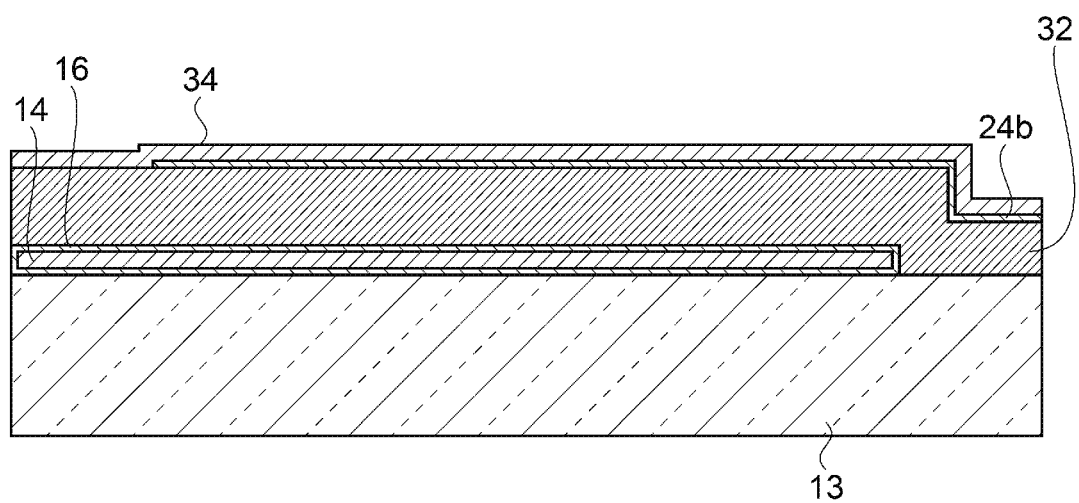
FIG. 18 is another schematic diagram for explaining the manufacturing method of the optical filter.

As illustrated in FIG. 18, a sixth film 34 which is a silver alloy film is formed so as to overlap the lower second protective film 24b. The silver alloy is a material of the second reflective film 18. As a method for forming the sixth film 34, the sputtering method or the vapor deposition method can be used. As the material of the sixth film 34, an Ag—Sm—Cu alloy was adopted.

Figure 19:
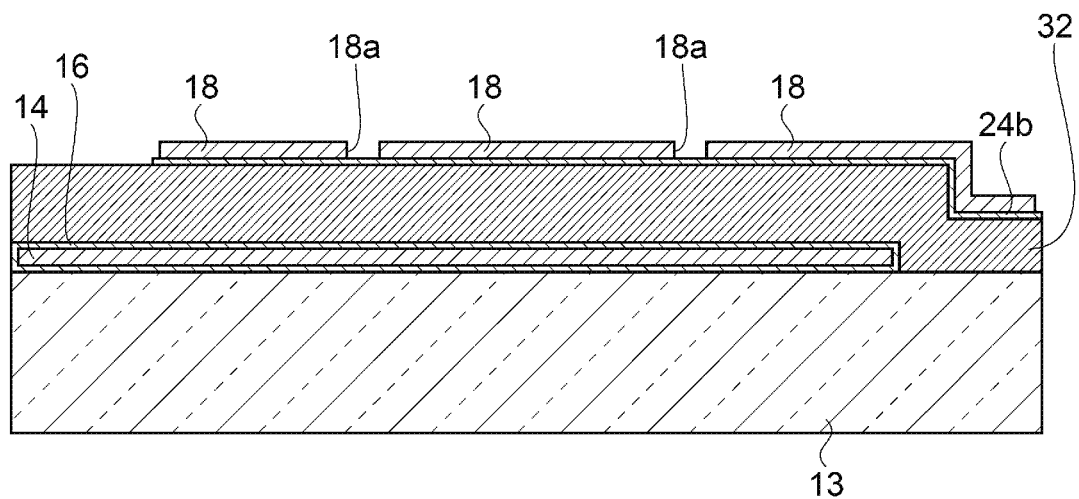
FIG. 19 is another schematic diagram for explaining the manufacturing method of the optical filter.

As illustrated in FIG. 19, the sixth film 34 is patterned. A photolithography method is used for patterning. The sixth film 34 is patterned to form a second reflective film 18. The through-holes 18a are formed in the second reflective film 18 along a circle.

Figure 20:
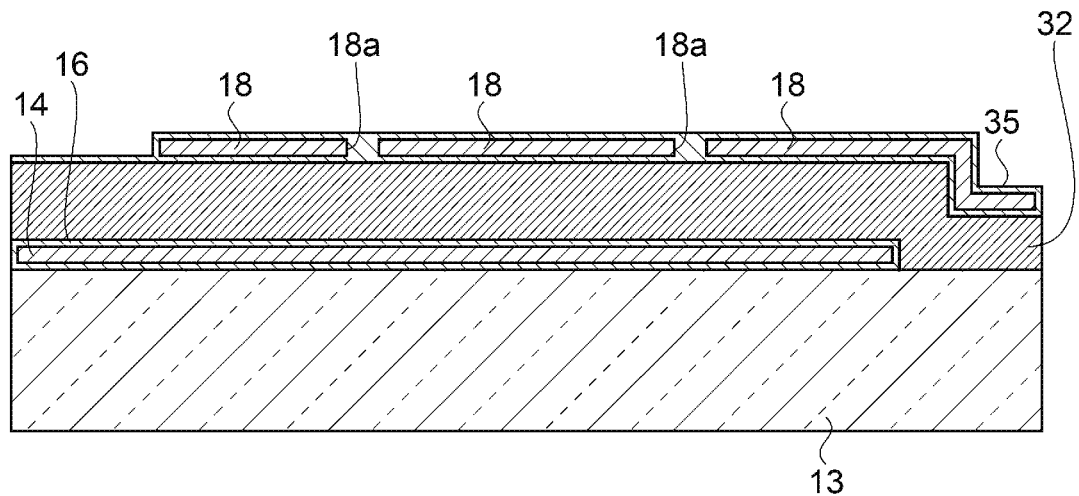
FIG. 20 is another schematic diagram for explaining the manufacturing method of the optical filter.

As illustrated in FIG. 20, a seventh film 35, which is a film of IGO which is a material of the second protective film 24, is provided on the second reflective film 18. The IGO is the material of the second protective film 24. As a method for forming the seventh film 35, the sputtering method or the ALD method can be used. In order to increase resistance of the protective film, it is desirable to use the ALD method capable of forming a dense film.

Figure 21:
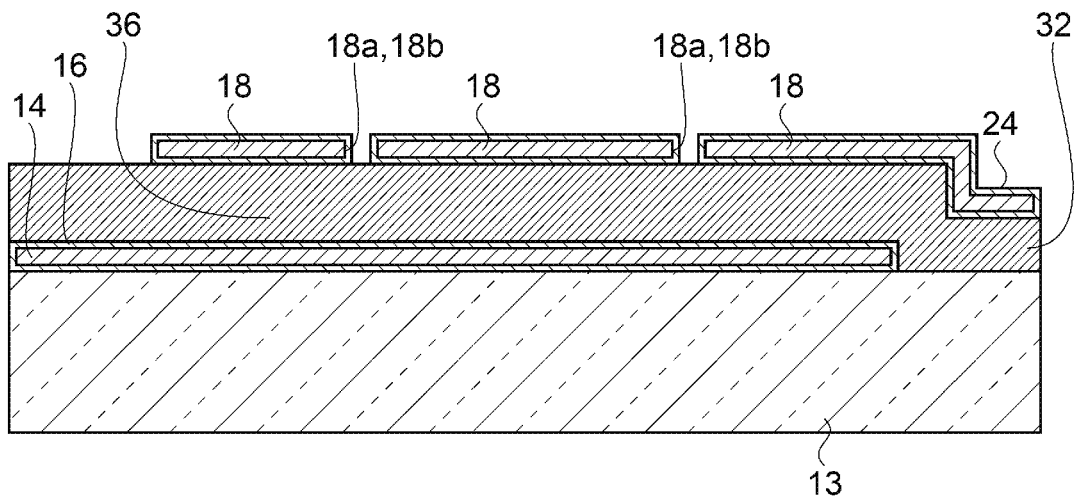
FIG. 21 is another schematic diagram for explaining the manufacturing method of the optical filter.

As illustrated in FIG. 21, the seventh film 35 is patterned. A photolithography method is used for patterning. The seventh film 35 is patterned to form the second protective film 24. In the through-hole 18a, the seventh film 35 is patterned so that the second protective film 24 covers a surface 18b. A structure in which the end portions of the second reflective film 18 are all covered with the second protective film 24 is formed. With this, the second reflective film 18 is not exposed to the etching gas or the like at the time of etching the sacrificial layer 36, and damage to the second reflective film 18 can be suppressed.

Figure 22:
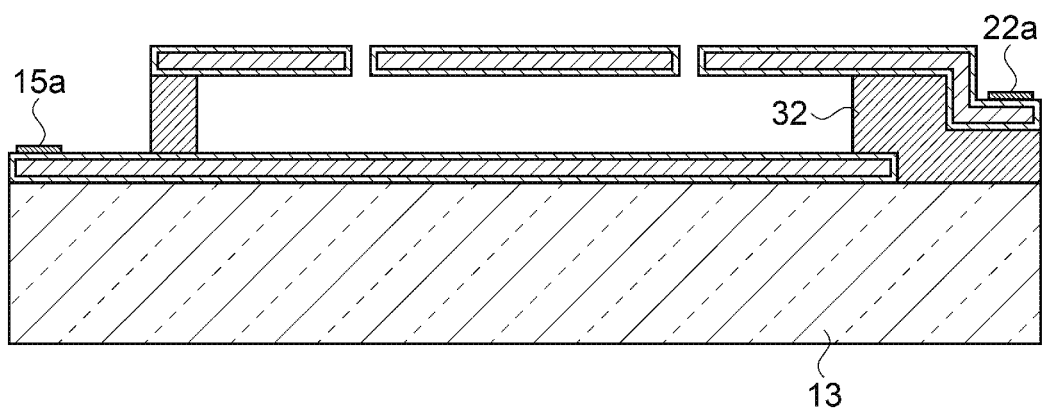
FIG. 22 is another schematic diagram for explaining the manufacturing method of the optical filter.

As illustrated in FIG. 22, etching of the sacrificial layer 36 is performed. When the material of the fourth film 32 is $SiO_2$, for example, an HF vapor etching method is used. In the HF vapor etching method, etching is performed by dry etching using anhydrous HF and alcohol. By using the method, it is possible to etch the sacrificial layer 36 while suppressing the influence on the first reflective film 14 and the second reflective film 18. When a resin material is used as the material of the supporting portion 17, etching can be performed by ultraviolet (UV), asking with $O_2$ plasma, or the like.

Next, a film is formed using the material of the first electrode terminal 15a and the second electrode terminal 22a, and thereafter, the film is patterned. For film formation, the sputtering method, the vapor deposition method, or CVD can be used. Then, the first electrode terminal 15a and the second electrode terminal 22a are formed. With the steps as described above, the optical filter 10 in which the Ag alloy is used for the first reflective film 14 and the second reflective film 18 can be manufactured.

The optical filter 10 manufactured in a wafer state is solidified and formed as an independent element. In this case, in a wet cutting method such as dicing, there is a concern that grinding liquid enters between the first reflective film 14 and the second reflective film 18, and the first reflective film 14 and the second reflective film 18 stick together. For that reason, it is desirable to use a dry cutting method such as scribing or laser. Etching of the sacrificial layer 36 may be performed after solidification.

Subsequently, as illustrated in FIG. 3, the optical filter 10 is hermetically sealed with the casing 2 and the second lid body 7. First, the casing 2 and the optical filter 10 are prepared. The first lid body 3, the first terminal 5, the second terminal 6, and the like are provided in the casing 2. The casing 2 can be manufactured by a known manufacturing method, and explanation thereof is omitted.

Next, the optical filter 10 is disposed in the internal space 9 in the casing 2, and a low melting point glass paste is disposed between the bottom surface of the substrate 13 and the casing 2. Subsequently, a positional relationship between the casing 2 and the optical filter 10 is fixed using a fixing jig (not illustrated). Next, the low melting point glass paste is heated to evaporate and remove a binder component. Furthermore, by melting the low melting point glass and slowly cooling and solidifying the low melting point glass, the casing 2 and the optical filter 10 are joined.

The first intermediate electrode 5a and the second intermediate electrode 6a are provided inside the casing 2. The first intermediate electrode 5a and the first electrode terminal 15a are connected by a gold wire. The second intermediate electrode 6a and the second electrode terminal 22a are connected by a gold wire. Connection of gold wires is done by a wire bonding method. The fixing jig is removed after the gold wire is provided.

Next, the second lid body 7 is disposed on the casing 2 via the low melting point glass paste. Then, the low melting point glass paste is heated under an environment set as a vacuum atmosphere by a vacuum chamber device or the like. After the low melting point glass paste is melted, the low melting point glass paste is gradually cooled. With this, the low melting point glass paste provided in the casing 2 becomes the second low melting point glass 8. Then, the optical module 1 is sealed in a state where the internal space 9 is depressurized. With the steps as described above, the optical module 1 is completed.

Packaging in a state where the internal space 9 is depressurized is called vacuum packaging. By performing vacuum packaging, resistance when the second reflective film 18 moves can be eliminated. With this, it is possible to move the second reflective film 18 at a high speed, and it is possible to increase responsiveness of switching the wavelength of light 21 transmitted through the optical filter 10.

As described above, the first embodiment has the following effects.

(1) According to the first embodiment, the optical filter 10 includes the substrate 13, and the first reflective film 14 is provided on the substrate 13. Furthermore, the supporting portion 17 is provided on the substrate 13, and the supporting portion 17 supports the second reflective film 18. The first reflective film 14 and the second reflective film 18 are disposed to face each other. When light 21 is incident between the first reflective film 14 and the second reflective film 18, light 21 is repeatedly reflected between the first reflective film 14 and the second reflective film 18. Then, only light 21 of which a distance between the first reflective film 14 and the second reflective film 18 corresponds to an integral multiple of a half wavelength passes through the first reflective film 14 or the second reflective film 18. Accordingly, the optical filter 10 functions as an optical filter for limiting and passing only light 21 having a predetermined wavelength.

When the material that semi-transmits light 21 in a visible light region to the first reflective film 14 and the second reflective film 18 is selected, the optical filter 10 can limit and pass only light 21 having a predetermined wavelength among light 21 in the visible light region. When the material that semi-transmits light 21 in the visible light region reacts with gas such as oxygen, optical characteristics change. In this case, the optical characteristics of the first reflective film 14 and the second reflective film 18 change. Since the first reflective film 14 is protected (covered) with the first protective film 16 so as not to be exposed, the first reflective film 14 is inhibited from reacting with gas such as oxygen. Since the second reflective film 18 is protected (covered) with the second protective film 24 so as not to be exposed, the second reflective film 18 is inhibited from reacting with gas such as oxygen. Accordingly, the optical filter 10 can suppress degradation of optical characteristics.

(2) According to the first embodiment, the first reflective film 14 and the second reflective film 18 are metal films. Reflectance of the metal film in the visible light region is high. Accordingly, the optical filter 10 can be used as an optical filter used in the visible light region.

(3) According to the first embodiment, the first reflective film 14 and the second reflective film 18 are Ag films or Ag alloy films. The Ag film or the Ag alloy film has high reflectance in the visible light region, even among metal films. Accordingly, reflectance and the transmittance of the first reflective film 14 and the second reflective film 18 can be selected over a wide range with respect to light in the visible light region.

(4) According to the first embodiment, the first protective film 16 and the second protective film 24 are conductive films. Accordingly, it is possible to energize the first reflective film 14 through the first protective film 16. Similarly, the second reflective film 18 can be energized through the second protection film 24. As a result, it is possible to apply a voltage between the first reflective film and the second reflective film by using the wirings provided in the first reflective film 14 and the second reflective film 18.

(5) According to the first embodiment, the first protective film 16 and the second protective film 24 are films having optical transparency. Since the first protective film 16 and the second protective film 24 have optical transparency, attenuation of intensity of light 21 by allowing light to pass through the first protective film 16 and the second protective film 24 can be suppressed.

(6) According to the first embodiment, the through-hole 18a is provided in the second reflective film 18. The surface 18b of the through-hole 18a is covered with the second protective film 24. Accordingly, it is possible to prevent the second reflective film 18 from reacting with the gas such as oxygen in the through-hole 18a.

(7) According to the first embodiment, the thicknesses of the first reflective film 14 and the second reflective film 18 are 10 nm or more. In this case, the first reflective film 14 and the second reflective film 18 are good quality. The thicknesses of the first reflective film 14 and the second reflective film 18 are 80 nm or less. In this case, the first reflective film 14 and the second reflective film 18 can semi-transmit visible light.

(8) According to the first embodiment, the material of the supporting portion 17 is silicon oxide or a resin material. When the optical filter 10 is manufactured, the same material as that of the supporting portion 17 is disposed between the first reflective film 14 and the second reflective film 18. Then, the silicon oxide or resin material between the first reflective film 14 and the second reflective film 18 is removed by using a misty etching liquid so as to make it possible to form the shape of the supporting portion 17. Accordingly, the internal space 9 can be provided between the first reflective film 14 and the second reflective film 18.

(9) According to the first embodiment, the first electrode 15 is provided on the substrate 13. Then, the second electrode 22 is supported by the supporting portion 17. When a voltage is applied between the first electrode 15 and the second electrode 22, electrostatic force acts between the first electrode 15 and the second electrode 22 and the distance between the first electrode 15 and the second electrode 22 changes. Accordingly, the first electrode 15 and the second electrode 22 are actuators 23 controlled by voltage.

The first reflective film 14 also functions as the first electrode 15 and the second reflective film 18 also functions as the second electrode 22. Accordingly, when a voltage is applied between the first reflective film 14 and the second reflective film 18, electrostatic force acts between the first reflective film 14 and the second reflective film 18 and the distance between the first reflective film 14 and the second reflective film 18 changes.

The optical filter 10 can have a simple structure as compared with the structure in which the first reflective film 14 and the first electrode 15 are separately provided on the substrate 13 and the second reflective film 18 and the second electrode 22 are separately provided above the substrate 13. Accordingly, the optical filter 10 can be manufactured with high productivity.

(10) According to the first embodiment, the optical module 1 includes the optical filter 10 and the casing 2. Then, the optical filter 10 can suppress degradation of optical characteristics. Accordingly, the optical module 1 can suppress degradation of optical characteristics.

Second Embodiment

Next, one embodiment of the optical filter will be described with reference to a schematic side cross-sectional view illustrating a structure of an optical filter in FIG. 23. The second embodiment is different from the first embodiment in that a shape maintaining film is provided so as to overlap the second reflective film 18. In this embodiment, the shape maintaining film overlapping to the second reflective film. Description of the same points as in the first embodiment will be omitted.

Figure 23:
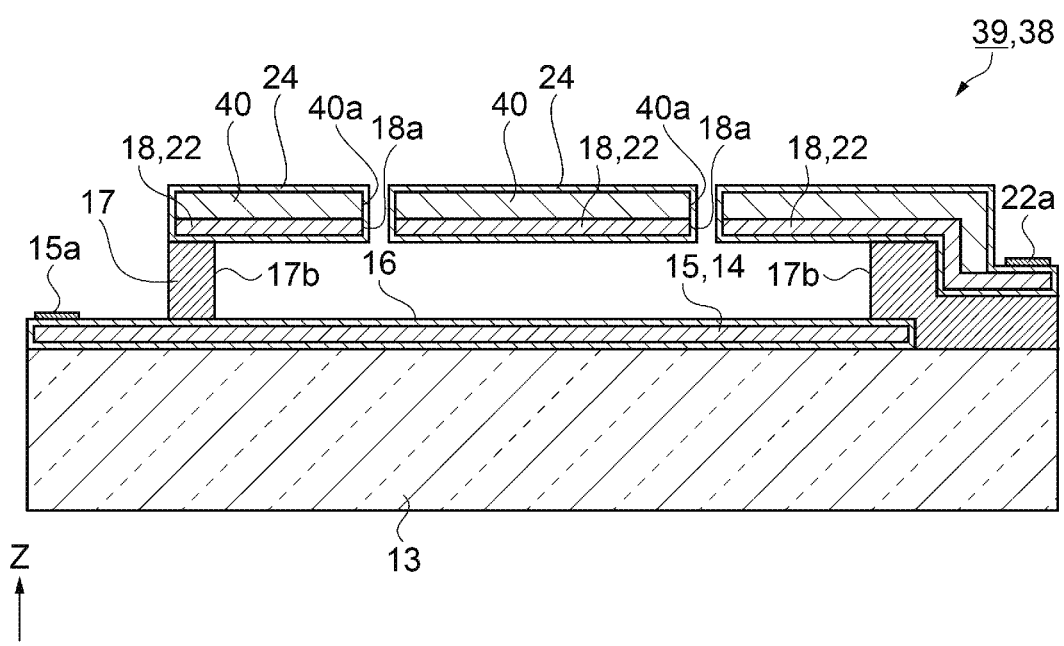
FIG. 23 is a schematic side cross-sectional view illustrating a structure of an optical filter according to a second embodiment.

That is, in the second embodiment, as illustrated in FIG. 23, in an optical filter 39 as a wavelength tunable optical filter provided inside an optical module 38, a shape maintaining film 40 is provided so as to overlap the second reflective film 18. The thickness of the second reflective film 18 is set from the optical characteristics of the second reflective film 18. When the second reflective film 18 is thin, the second reflective film 18 is easily deformed. In this case, the shape maintaining film 40 is set to overlap the second reflective film 18 so as to make it possible to adjust a spring constant of the second reflective film 18 and the shape maintaining film.

The material of the shape maintaining film 40 is not particularly limited as long as it has high translucency and rigidity. In the second embodiment, for example, $SiO_2$ is adopted as the material of the shape maintaining film 40. By setting the thickness of the shape maintaining film 40 to 1 µm to 10 µm, the shape can be maintained.

An outer shape of the shape maintaining film 40 is substantially the same as the outer shape of the second reflective film 18. A through-hole 40a is provided at a place facing the through-hole 18a. The second reflective film 18 and the shape maintaining film 40 are disposed so that the through-hole 18a and the through-hole 40a are connected to each other. The second reflective film 18 and the shape maintaining film 40 are covered with the second protective film 24 so as not to be exposed. The through-hole 18a and the through-hole 40a are used for etching and discharging the sacrificial layer 36 made of the same material as the supporting portion 17.

Next, a method of manufacturing the optical filter 39 will be described. The first reflective film 14, the first protection film 16, the fourth film 32, the lower second protection film 24b, and the sixth film 34 are formed on the substrate 13 similarly as in the first embodiment. Next, an eighth film, which is a film of $SiO_2$ which is a material of the shape maintaining film 40, is formed by the CVD method or the like. Next, the sixth film 34 and the eighth film are patterned to form shapes of the second reflective film 18 and the shape maintaining film 40. In this case, the through-hole 18a and the through-hole 40a are also formed.

Next, a second protective film 24 is formed so as to cover the second reflective film 18 and the shape maintaining film 40. Subsequently, the sacrificial layer 36 is removed such that the optical filter 39 having a monolithic structure in which strength of the second reflective film 18 is secured is completed. Although the shape maintaining film 40 and the supporting portion 17 may be made of the same material, the shape maintaining film 40 and the supporting portion 17 may be made of different materials in order to make it easy to manufacture. For example, the material of the shape maintaining film 40 may be $SiO_2$ and the material of the supporting portion 17 may be made of a resin material. With this, it is possible to widen the range of various methods used in steps of a manufacturing process.

As described above, the second embodiment has the following effects.

(1) According to the second embodiment, in the optical filter 39, the shape maintaining film 40 is provided so as to overlap the second reflective film 18. The thickness of the second reflective film 18 is set from the optical characteristics of the second reflective film 18. When the second reflective film 18 is thin, the second reflective film 18 is easily deformed. In this case, the shape maintaining film 40 is set to overlap the second reflective film 18 so as to make it possible to adjust the spring constant of the second reflective film 18 and the shape maintaining film.

Third Embodiment

Next, one embodiment of the optical filter will be described with reference to FIGS. 24 to 26. The third embodiment is different from the first embodiment in that the inter-electrode distance is made longer than the inter-reflective film distance. Description of the same points as in the first embodiment will be omitted.

Figure 24:
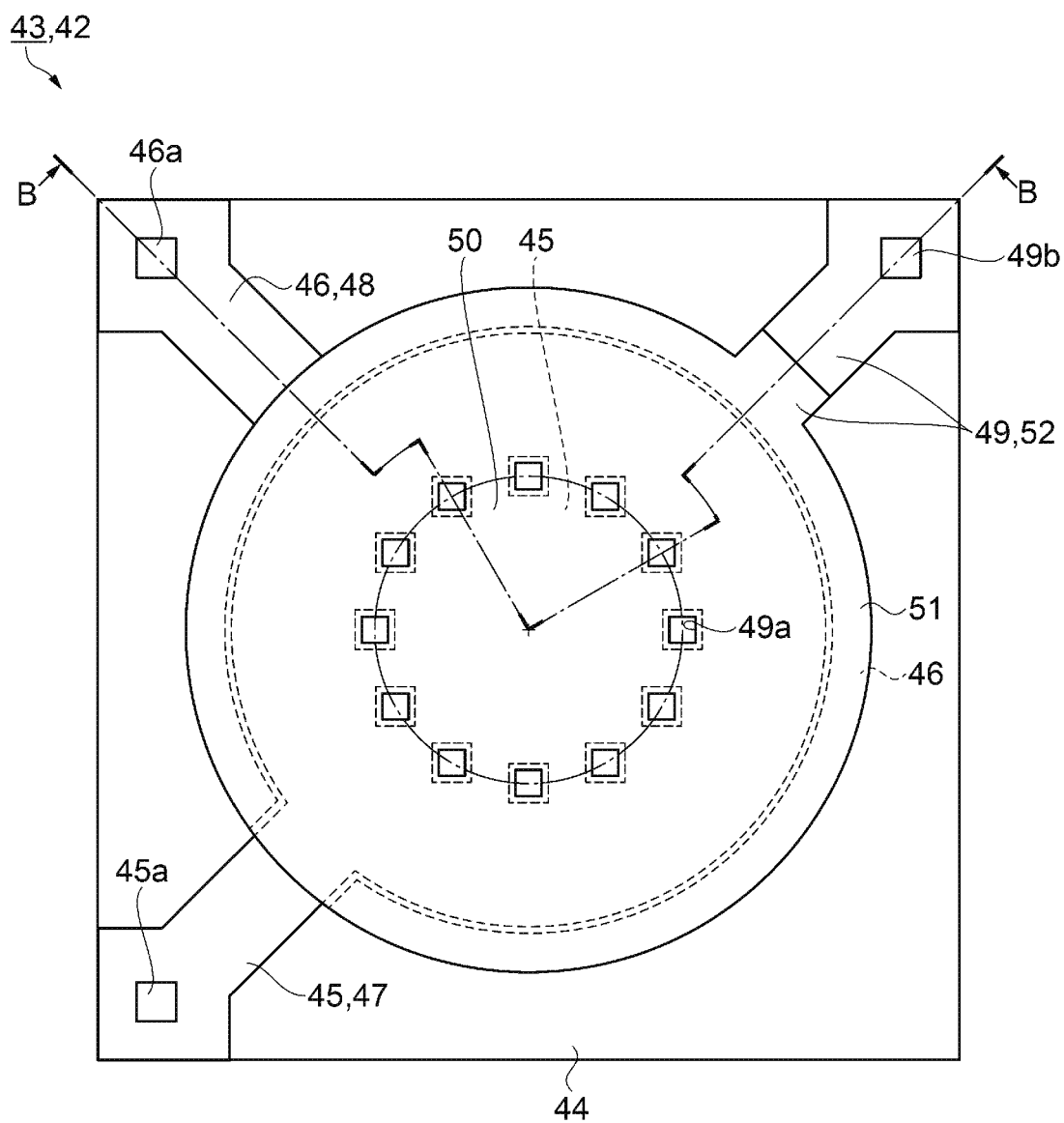
FIG. 24 is a schematic plan view illustrating a structure of an optical filter according to a third embodiment.

FIG. 24 is a schematic plan view illustrating the structure of the optical filter. FIG. 25 is a schematic side cross-sectional view illustrating the structure of the optical filter. FIG. 25 is a view when viewed from the cross-sectional side along line B-B of FIG. 24.

Figure 25:
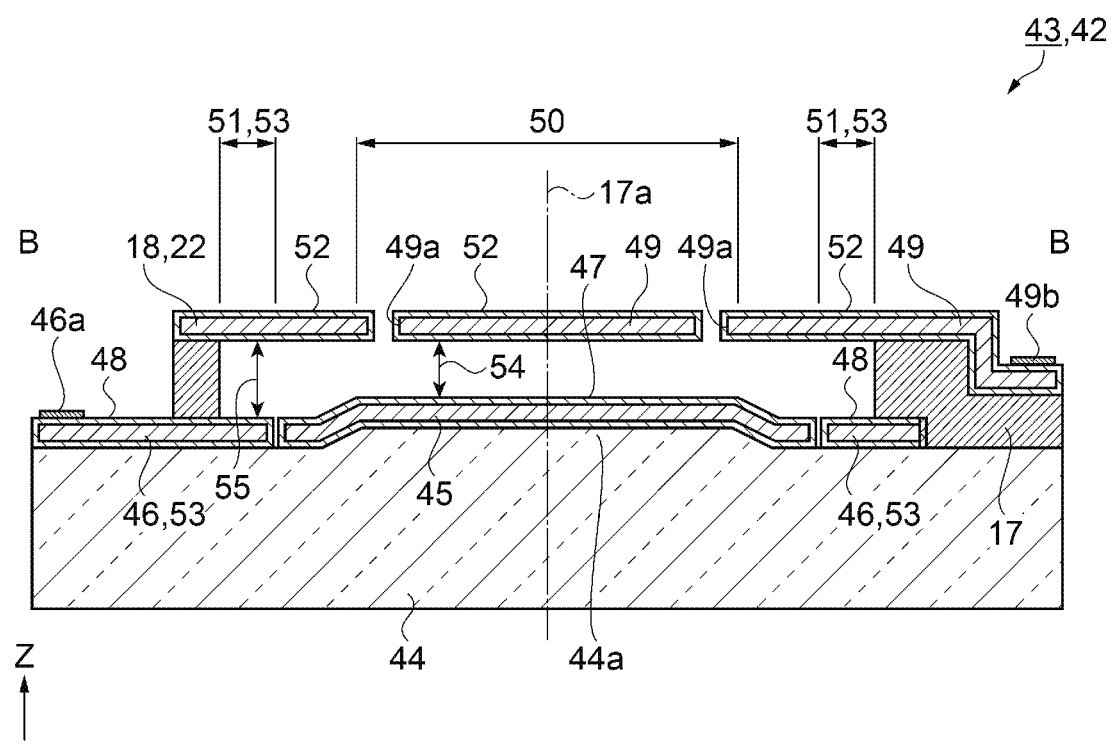
FIG. 25 is a schematic side cross-sectional view illustrating a structure of the optical filter.

As illustrated in FIGS. 24 and 25, an optical filter 43 as a wavelength tunable optical filter provided inside an optical module 42 includes a substrate 44. The substrate 44 includes a reflective film installation portion 44a of which the central portion is protruded toward the second reflective film 18 side. The planar shape of the reflective film installation portion 44a when viewed from the Z-direction is circular.

On the surface of the substrate 44 on the +Z-direction side, a first reflective film 45 and a first electrode 46 are provided. The first reflective film 45 is provided so as to cover the reflective film installation portion 44a, and has a substantially circular planar shape when viewed from the Z-direction. A portion of the first reflective film 45 extends in the −X-direction and the −Y-direction side. The first electrode 46 surrounds the first reflective film 45 in a plan view when viewed from the Z-direction, and has a substantially annular shape. A portion of the first electrode 46 extends in the −X-direction and the +Y-direction side. A portion of the first electrode 46 in the −X-direction and the −Y-direction side is removed. Then, the first reflective film 45 is provided at the place where the first electrode 46 is removed. The first reflective film 45 is provided separately from the first electrode 46.

The first reflective film 45 is a metal film having conductivity, and is an Ag film or an Ag alloy film. The first reflective film 45 is covered with a third protection film 47 as a protection film so as not to be exposed. The first electrode 46 is also covered with a fourth protective film 48 as a protective film so as not to be exposed. The third protective film 47 and a fourth protective film 48 are conductive films. Furthermore, the third protective film 47 has optical transparency.

A first electrode terminal 46a is provided on the first electrode 46 and the fourth protective film 48 extending in the −X-direction and the +Y-direction side. A third electrode terminal 45a is provided on the first reflective film and the third protection film 47 extending in the −X-direction and the −Y-direction side. The first electrode terminal 46a is a terminal connected to the first intermediate electrode provided on the casing 2 by the gold wire 11. The third electrode terminal 45a is a terminal connected to the third intermediate electrode provided in the casing 2 by the gold wire 11.

The ring-shaped supporting portion 17 is provided on the substrate 44 and the fourth protective film 48. The center 17a of the supporting portion 17 is positioned at the same position as the center of the first reflective film 45. A conductive reflective film 49 is provided in the +Z-direction of the supporting portion 17. The supporting portion 17 is provided on the substrate 44 and supports the conductive reflective film 49. In the conductive reflective film 49, a portion of the reflective film setting portion 44a facing the first reflective film 45 is a second reflective film 50 and a portion facing the first electrode 46 is a second electrode 51. The second reflective film 50 is connected to the second electrode 51.

The conductive reflective film 49 is a metal film, and is an Ag film or an Ag alloy film. The conductive reflective film 49 is covered with a fifth protection film 52 as a protection film so as not to be exposed. Accordingly, the second reflective film 50 and the second electrode 51 are covered with the fifth protection film 52 so as not to be exposed. The fifth protective film 52 is a conductive film having optical transparency. As the material of the fifth protective film 52, the same IGO film as that of the second protective film 24 of the first embodiment is used.

A through-hole 49a similar to the through-hole 18a of the second reflective film 18 of the first embodiment is provided in the conductive reflective film 49. Etching of the sacrificial layer 36 is performed by using the through-hole 49a.

A portion of the conductive reflective film 49 and the fifth protection film 52 extends in the +X-direction and the +Y-direction in a plan view when viewed from the Z-direction. A second electrode terminal 49b is provided on the conductive reflective film 49 and the fifth protective film 52 extending in the +X-direction and +Y-direction. The second electrode terminal 49b is a terminal connected to the second intermediate electrode provided on the casing 2 by the gold wire 11.

The second reflective film 50 is disposed to face the first reflective film 45. When light 21 is incident between the first reflective film 45 and the second reflective film 50, light 21 is repeatedly reflected between the first reflective film 45 and the second reflective film 50. Then, only light of which an integer multiple of a half wavelength corresponds to the distance between the first reflective film 45 and the second reflective film 50 passes through the first reflective film 45 or the second reflective film 50. Accordingly, the optical filter 43 functions as an optical filter for limiting and passing only light 21 having a predetermined wavelength.

An actuator 53 is configured with the first electrode 46 provided on the substrate 44, the second electrode 51 supported by the supporting portion 17, and the like. When a voltage is applied between the first electrode 46 and the second electrode 51, electrostatic force acts between the first electrode 46 and the second electrode 51 and the distance between the first electrode 46 and the second electrode 51 changes. Accordingly, the first electrode 46 and the second electrode 51 are actuators 53 controlled by voltage.

The distance between the first reflective film 45 and the second reflective film 50 is defined as the inter-reflective film distance 54, and the distance between the first electrode 46 and the second electrode 51 is defined as the inter-electrode distance 55. In this case, the inter-electrode distance 55 is longer than the inter-reflective film distance 54.

The inter-reflective film distance 54 is a distance which is set corresponding to the wavelength of light 21 that the light filter 43 passes. Then, the inter-electrode distance 55 is a distance which is set corresponding to the distance for changing the distance between the electrodes. It is possible to lengthen the distance for changing the inter-electrode distance 55 in a case where the inter-electrode distance 55 is longer than the inter-reflective film distance 54 than a case where the inter-electrode distance 55 is the same as the inter-reflective film distance 54. As a result, it is possible to widen the selection range of the wavelength of light 21 to be transmitted.

Figure 26:
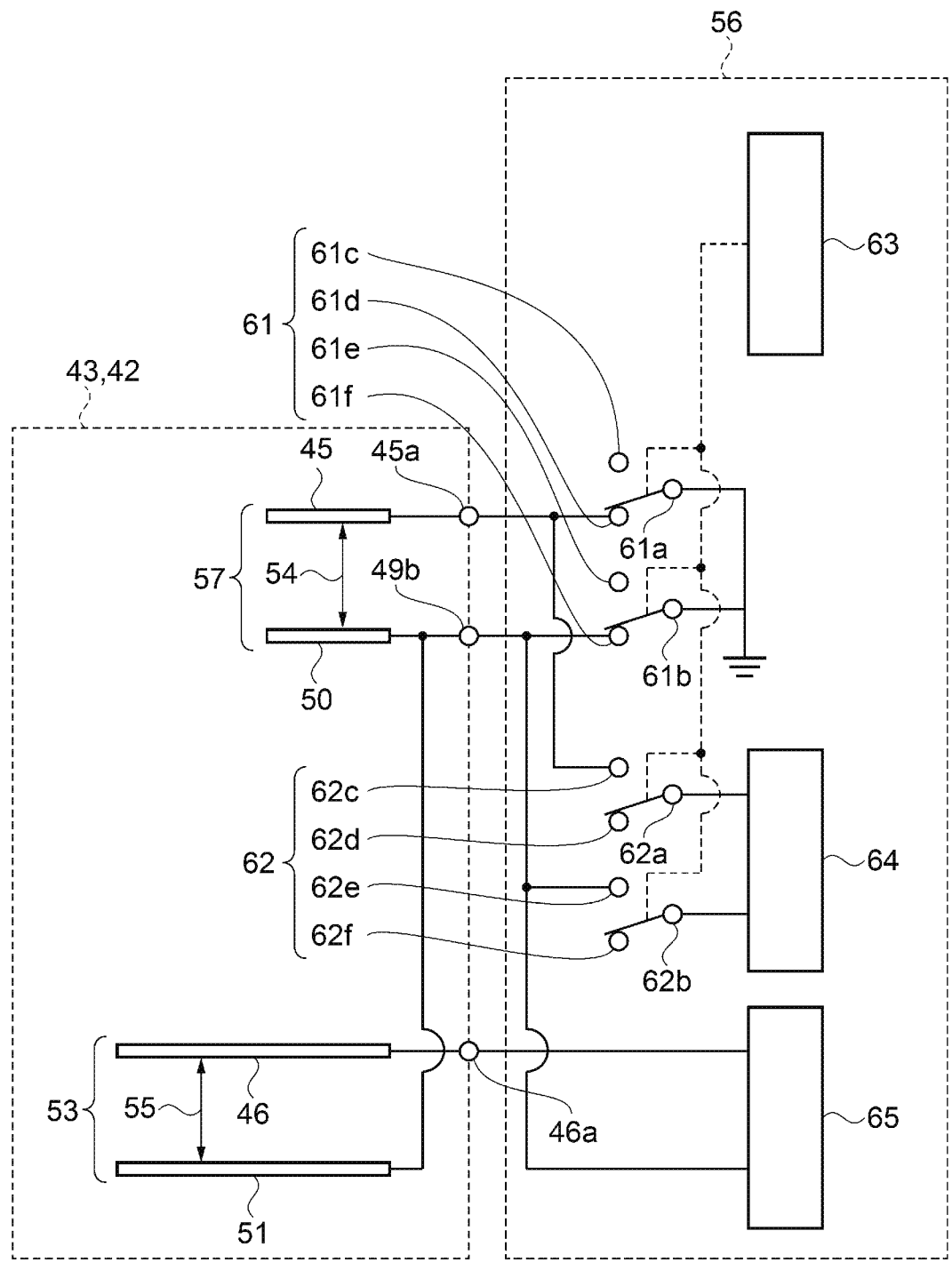
FIG. 26 is an electric control block diagram of a control unit.

FIG. 26 is an electric control block diagram of the control unit. As illustrated in FIG. 26, the optical module 42 on which the optical filter 43 is provided is used in connection with the control unit 56. By applying a voltage between the first electrode 46 and the second electrode 51 of the optical filter 43, electrostatic force acts between the first electrode 46 and the second electrode 51. Since the conductive reflective film 49 is thin, the conductive reflective film 49 is easily deformed in the Z-direction. Then, the inter-electrode distance 55 changes due to electrostatic force acting between the first electrode 46 and the second electrode 51. Then, the inter-reflective film distance 54 changes as the inter-electrode distance 55 changes. The actuator 53 is configured with the first electrode 46, the second electrode 51, the conductive reflective film 49, and the like.

When the inter-reflective film distance 54 changes, the electric capacitance between the first reflective film 45 and the second reflective film 50 changes. Accordingly, the distance between the first reflective film 45 and the second reflective film 50 can be estimated by measuring the electric capacitance between the first reflective film 45 and the second reflective film 50. The first reflective film 45 and the second reflective film 50 are distance sensors 57 for estimating the inter-reflective film distance 54.

In a control unit 56, two switches of a first switch 61 and a second switch 62, and a switch control unit 63 for controlling the first switch 61 and the second switch 62 are provided. Each switch is in the form of a 2-way circuit, 2-way contact switch. The first switch 61 includes a first movable cut piece 61a, a second movable cut piece 61b, a first contact 61c, a second contact 61d, a third contact 61e, and a fourth contact 61f.

Both the first movable cut piece 61a and the second movable cut piece 61b are grounded. The first contact 61c is a contact which is isolated and not connected. The second contact 61d is connected to the first reflective film 45 via the third electrode terminal 45a. The first movable cut piece 61a conducts with one of the first contact 61c and the second contact 61d. Similarly, the third contact 61e is a contact which is isolated and not connected. The fourth contact 61f is connected to the second reflective film 50 and the second electrode 51 via the second electrode terminal 49b. The second movable cut piece 61b conducts with one of the third contact 61e and the fourth contact 61f.

The first movable cut piece 61a and the second movable cut piece 61b are interlocked and controlled by the switch control unit 63. The switch control unit 63 brings the first movable cut piece 61a into conduction with the first contact 61c to conduct the second movable cut piece 61b with the third contact 61e. In this case, in the first switch 61, the first reflective film 45 is cut off from the first movable cut piece 61a and the second reflective film 50 is cut off from the second movable cut piece 61b. On the other hand, when the switch control unit 63 brings the first movable cut piece 61a into conduction with the second contact 61d to conduct the second movable cut piece 61b with the fourth contact 61f, the first reflection film 45 and the second reflection film 50 are brought into a grounded state in the first switch 61. Accordingly, the switch control unit 63 can control whether the first reflective film 45 and the second reflective film 50 are to be short-circuited and grounded or released.

The second switch 62 includes a first movable cut piece 62a, a second movable cut piece 62b, a first contact point 62c, a second contact 62d, a third contact 62e, and a fourth contact 62f. The first movable cut piece 62a and the second movable cut piece 62b are connected to a distance measurement unit 64. The first contact 62c is connected to the first reflective film 45 via the third electrode terminal 45a. The second contact 62d is a contact which is isolated and not connected. The first movable cut piece 62a conducts with one of the first contact 62c and the second contact 62d. Similarly, the third contact 62e is connected to the second reflective film 50 via the second electrode terminal 49b. The fourth contact 62f is a contact which is isolated and not connected. The second movable cut piece 62b conducts with one of the third contact 62e and the fourth contact 62f. The distance detection unit 64 has a function of measuring the distance between the first reflective film 45 and the second reflective film 50 by measuring the electric capacitance between the first reflective film 45 and the second reflective film 50.

The optical filter 43 has external terminals of the second electrode terminal 49b and the third electrode terminal 45a. The distance measurement unit 64 can measure the distance between the first reflective film 45 and the second reflective film 50 by using the external terminals of the second electrode terminal 49b and the third electrode terminal 45a.

The first movable cut piece 62a and the second movable cut piece 62b are interlocked and controlled by the switch control unit 63. The switch controller 63 brings the first movable cut piece 62a into conduction with the first contact 62c to conduct the second movable cut piece 62b with the third contact 62e. In this case, in the second switch 62, the first reflective film 45 and the second reflective film 50 are connected to the distance measurement unit 64. On the other hand, when the switch control unit 63 brings the first movable cut piece 62a into conduction with the second contact 62d to conduct the second movable cut piece 62b with the fourth contact 62f, the second reflective film 50 and the first reflective film 45 are disconnected from distance measurement unit 64 in the second switch 62. Accordingly, the switch controller 63 can control whether to connect the second reflective film 50 and the first reflective film 45 to the distance detector 64 or ground.

When the control unit 56 measures the inter-reflective film distance 54, the switch control unit 63 switches the first switch 61 and the second switch 62. In the first switch 61, the switch control unit 63 brings the first movable cut piece 61a into contact with the first contact 61c. Furthermore, the switch controller 63 brings the second movable cut piece 61b into contact with the third contact 61e. Furthermore, in the second switch 62, the switch control unit 63 brings the first movable cut piece 62a into contact with the first contact 62c. Furthermore, the switch controller 63 brings the second movable cut piece 62b into contact with the third contact 62e. With this, the first reflective film 45 and the second reflective film 50 are connected to the distance measurement unit 64, respectively. Then, the distance measurement unit 64 energizes the first reflective film 45 and the second reflective film 50 to measure the electric capacitance between the first reflective film 45 and the second reflective film 50. With this, the distance measurement unit 64 measures the inter-reflective film distance 54.

When the distance measurement unit 64 does not measure a gap between the reflective films, the switch control unit 63 of the first switch 61 brings the first movable cut piece 61a into contact with the second contact 61d. Further, the switch controller 63 brings the second movable cut piece 61b into contact with the fourth contact 61f. In the second switch 62, the switch control unit 63 brings the first movable cut piece 62a into contact with the second contact 62d. Furthermore, the switch controller 63 brings the second movable cut piece 62b into contact with the fourth contact 62f. With this, the first reflective film 45, the second reflective film 50, and the second electrode 51 are respectively grounded, and are electrically connected to each other.

Molecules such as water molecules and oxygen molecules move between the first reflective film 45 and the second reflective film 50, and the molecules collide with each other. In this case, static electricity may be generated in each molecule. When the molecules having static electricity come into contact with the first reflective film 45 and the second reflective film 50, the first reflective film 45 and the second reflective film 50 are charged. When a voltage difference is generated between the first reflective film 45 and the second reflective film 50 due to static electricity, electrostatic force is generated between the first reflective film 45 and the second reflective film 50. With this, the gap between the reflective films varies. As the inter-reflective film gap varies, the wavelength of the light passing through the optical filter 43 varies. Thus, the switch control unit grounds the first reflective film 45 and the second reflective film 50 at predetermined time intervals. With this, since static electricity of the first reflective film 45 and the second reflective film 50 is removed, the gap between the reflective films can be controlled with high accuracy.

The first switch 61 and the second switch 62 may be a switching element made of a semiconductor such as a transistor, or may be an electromagnetic switch. When the current is small, it is preferable to use a switching element made of a semiconductor because it is easier to manufacture and has durability. In the third embodiment, for example, the first switch 61 and the second switch 62 use switching elements made of semiconductors.

A voltage control unit 65 is provided in the control unit 56, and the first electrode 46 and the second electrode 51 are electrically connected to the voltage control unit 65. The voltage control unit 65 can control the inter-reflective film distance 54 by controlling the voltage to be applied to the first electrode 46 and the second electrode 51. The voltage control unit 65 changes the inter-reflective film distance 54 at predetermined intervals. Then, light 21 is incident onto the optical filter 43. The light 21 is multiple-reflected between the first reflective film 45 and the second reflective film 50, and light having a wavelength corresponding to the dimension of the inter-reflective film distance 54 passes through the optical filter 43. Accordingly, the voltage control unit 65 can control the wavelength of light 21 passing through the optical filter 43 by controlling the inter-reflection film distance 54.

As such, the voltage between the first electrode 46 and the second electrode 51 is controlled by the voltage control unit 65. Then, the electric capacitance between the first reflective film 45 and the second reflective film 50 is measured. The electric capacitance between the first reflective film 45 and the second reflective film 50 is measured so as to make it possible to measure the inter-reflective film distance 54. Accordingly, it is possible to control the inter-reflective film distance 54 to a target distance by detecting the inter-reflective film distance 54 and controlling the voltage between the first electrode 46 and the second electrode 51.

As described above, according to the third embodiment, the following effects are obtained.

(1) According to the third embodiment, the first electrode 46 is provided on the substrate 44. Then, the second electrode 51 is supported by the supporting portion 17. When a voltage is applied between the first electrode 46 and the second electrode 51, electrostatic force acts between the first electrode 46 and the second electrode 51 and the distance between the first electrode 46 and the second electrode 51 changes. Accordingly, the first electrode 46 and the second electrode 51 are actuators 53 controlled by a voltage.

The distance between the first reflective film 45 and the second reflective film 50 is the inter-reflective film distance 54. The distance between the first electrode 46 and the second electrode 51 is the inter-electrode distance 55. The inter-electrode distance 55 is longer than the inter-reflective film distance 54. The inter-reflective film distance 54 is a distance which is set corresponding to the wavelength that the optical filter 43 passes. The inter-electrode distance 55 is a distance which is set corresponding to the distance at which the inter-electrode distance 55 is changed. It is possible to lengthen the distance for changing the inter-electrode distance 55 in a case where the inter-electrode distance 55 is longer than the inter-reflective film distance 54 than a case where the inter-electrode distance 55 is the same as the inter-reflective film distance 54. As a result, the range of the wavelength of the light to be transmitted can be widened.

(2) According to the third embodiment, the second reflective film 50 and the second electrode 51 are connected to each other. The first reflective film 45 and the first electrode 46 are separated from each other. It is possible to control the distance between the first electrode 46 and the second electrode 51 by controlling the voltage between the first electrode 46 and the second electrode 51. The distance between the first reflective film 45 and the second reflective film 50 is highly correlated with the distance between the first electrode 46 and the second electrode 51. Accordingly, the distance between the first reflective film 45 and the second reflective film 50 can be controlled. The distance between the first reflective film 45 and the second reflective film 50 can be measured by measuring the electric capacitance between the first reflective film 45 and the second reflective film 50. Accordingly, it is possible to control the distance between the first reflective film 45 and the second reflective film 50 to a target distance by measuring the distance between the first reflective film 45 and the second reflective film 50 and controlling the voltage between the first electrode 46 and the second electrode 51.

(3) According to the third embodiment, the third protective film 47, the fourth protective film 48 and the fifth protective film 52 are conductive films. Accordingly, the first electrode 46 can be energized through the fourth protective film 48. Similarly, the second electrode 51 can be energized through the fifth protective film 52. As a result, a voltage can be applied between the first electrode 46 and the second electrode 51, by using the first electrode terminal 46a, the second electrode terminal 49b that are respectively provided on the fourth protective film 48 and the fifth protective film 52, the gold wire 11, and the like.

Furthermore, the first reflective film 45 can be energized through the third protection film 47. Similarly, the second reflective film 50 can be energized through the fifth protective film 52. As a result, it is possible to measure electric capacitance between the first reflective film 45 and the second reflective film 50, by using the second electrode terminal 49b and the third electrode terminal 45a that are respectively provided on the third protective film 47 and the fifth protective film 52, and the gold wire 11.

Fourth Embodiment

Next, an embodiment of a colorimetric apparatus including the optical module 1, the optical module 38, or the optical module 42 described above will be described with reference to FIG. 27. Description of the same points as the embodiments described above will be omitted.

Colorimetric Apparatus

Figure 27:
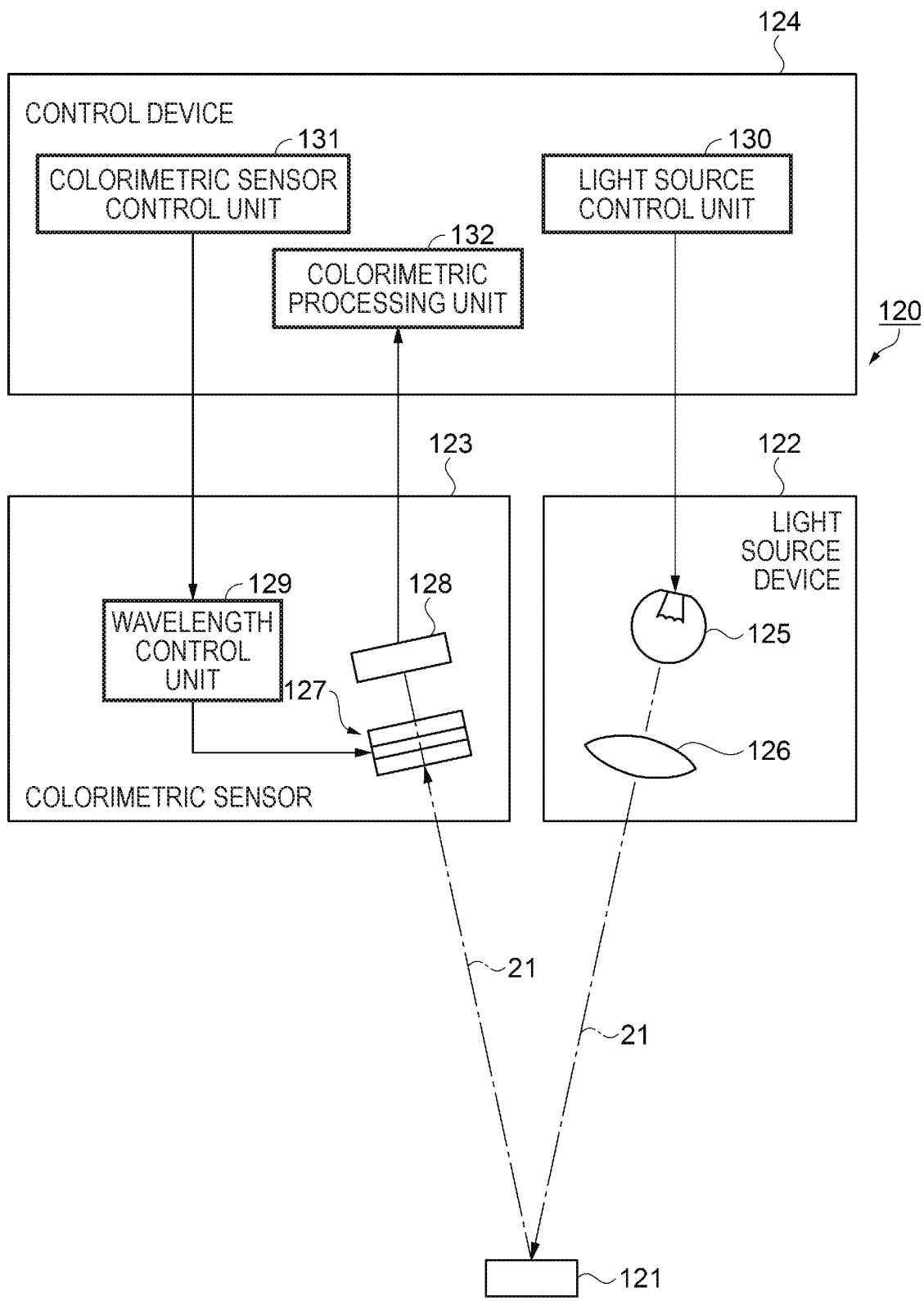
FIG. 27 is a block diagram illustrating a configuration of a colorimetric apparatus according to a fourth embodiment.

FIG. 27 is a block diagram illustrating a configuration of a colorimetric apparatus. As illustrated in FIG. 27, the colorimetric apparatus 120 as an electronic apparatus includes a light source device 122 that emits light 21 to a measurement target 121, a colorimetric sensor 123, a control device 124 that controls the overall operation of the colorimetric apparatus 120. The colorimetric apparatus 120 reflects light emitted from the light source device 122 on the measurement target 121. The colorimetric sensor 123 receives reflected inspection target light. On the basis of a detection signal output from the colorimetric sensor 123, the colorimetric apparatus 120 analyzes and measures chromaticity of the inspection target light, that is, a color of the measurement target 121.

The light source device 122 includes a light source 125 and a plurality of lenses 126 (only one lens is illustrated in FIG. 27), and emits reference light such as white light to the measurement target 121. The plurality of lenses 126 may include a collimator lens. In this case, the collimator lens converts reference light emitted from the light source 125 into parallel light, and the light source device 122 emits light 21 toward the measurement target 121 from a projection lens (not illustrated). In the fourth embodiment, although the colorimetric apparatus 120 including the light source device 122 is exemplified, for example, in a case where the measurement target 121 is a light emitting member such as a liquid crystal panel, a configuration in which the light source device 122 is not provided may be adopted.

The colorimetric sensor 123 includes an optical module 127, a detector 128 for receiving light transmitted through the optical module 127, and a wavelength control unit 129 as a control unit for controlling the wavelength of light 21 to be transmitted through the optical module 127. For the optical module 127, the optical module 1, the optical module 38, or the optical module 42 described above is used. The wavelength control unit 129 controls the optical module 127.

The colorimetric sensor 123 includes an incident optical lens (not illustrated) at a place facing the optical module 127. The incident optical lens guides reflected light (inspection object light) reflected by the measurement target 121 to the inside of the colorimetric sensor 123. Then, in the colorimetric sensor 123, the optical module 127 spectrally separates light 21 having a predetermined wavelength of the inspection target light incident from the incident optical lens, and the detector 128 receives the spectrally separated light.

The control device 124 controls the overall operation of the colorimetric apparatus 120. As the control device 124, an exclusive computer of colorimetry or the like can be used, in addition to a general-purpose personal computer and a portable information terminal, for example. The control device 124 is configured to include a light source control unit 130, a colorimetric sensor control unit 131, a colorimetric processing unit 132, and the like. The light source control unit 130 is connected to the light source device 122, and outputs a predetermined control signal to the light source device 122 based on, for example, operator's setting input to emit white light of predetermined brightness. The colorimetric sensor control unit 131 is connected to the wavelength control unit 129 of the colorimetric sensor 123. For example, the colorimetric sensor control unit 131 sets the wavelength of the light to be received by the colorimetric sensor 123 based on the operator's setting input. Then, the colorimetric sensor control unit 131 outputs a control signal to the wavelength control unit 129 to measure an amount of received light of light 21 having the set wavelength. With this, the wavelength control unit 129 drives the optical module 127 based on the control signal. The colorimetric processing unit 132 analyzes chromaticity of the measurement target 121 from the amount of received light measured by the detector 128.

The color measurement apparatus 120 includes the optical module 127 and the wavelength control unit 129 for controlling the optical module 127. The wavelength control unit 129 controls the optical module 127 to control the wavelength of light 21 that the optical module 127 passes. In the optical module 127, any one of the optical module 1, the optical module 38, and the optical module 42 described above is used. Accordingly, the optical module 127 is a module capable of suppressing degradation of optical characteristics. As a result, the color measuring apparatus 120 can be an apparatus provided with a module capable of suppressing deterioration of optical characteristics.

Fifth Embodiment

Next, an embodiment of a gas detection apparatus including the optical module 1 described above will be described with reference to FIGS. 28 and 29. The gas detection apparatus is used, for example, for an on-vehicle gas leak detector for detecting specific gas with high sensitivity, a photoacoustic rare gas detector for expiration inspection, and the like. Description of the same points as the embodiments described above will be omitted.

Figure 28:
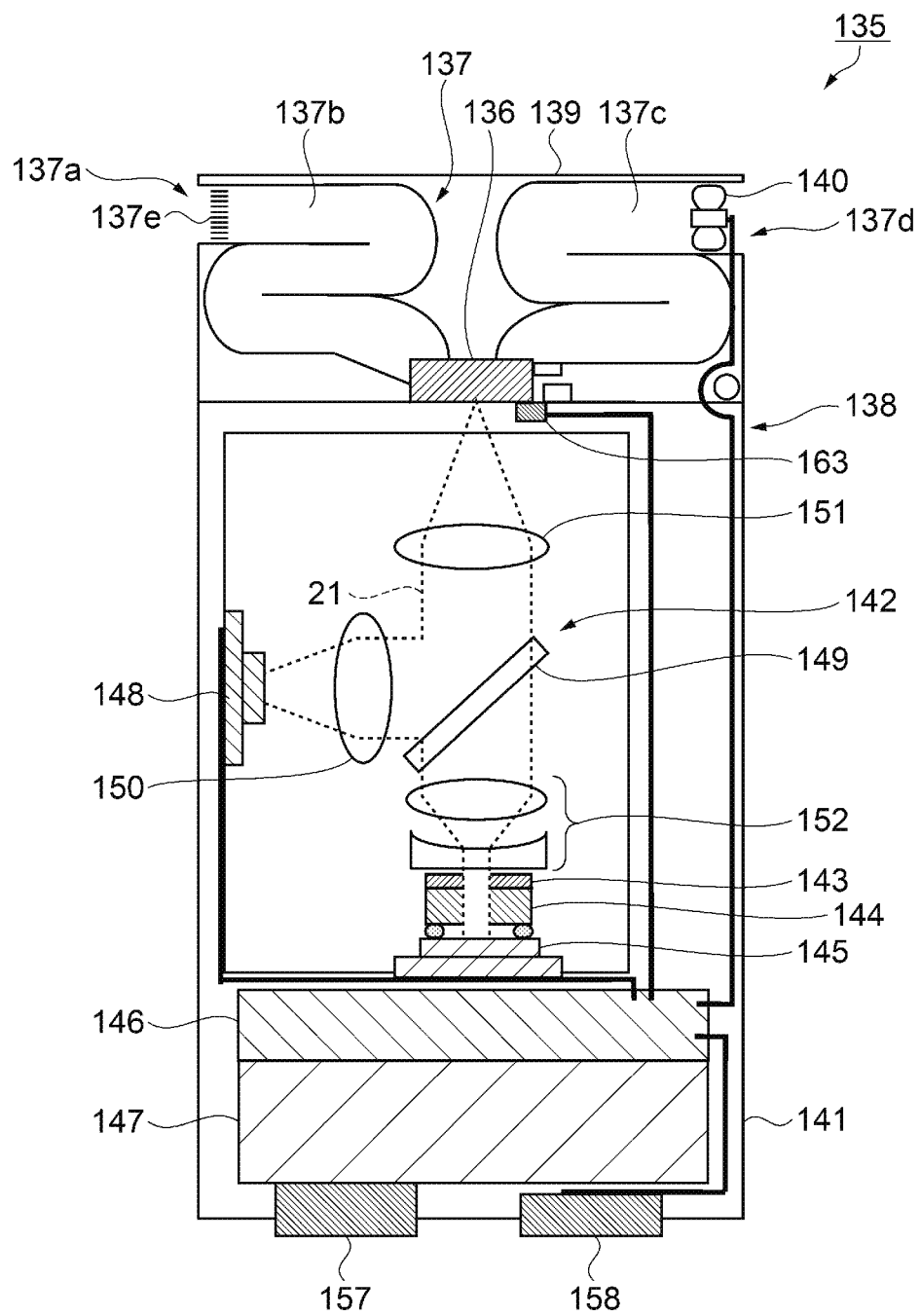
FIG. 28 is a schematic front view illustrating a configuration of a gas detection apparatus according to a fifth embodiment.
Figure 29:
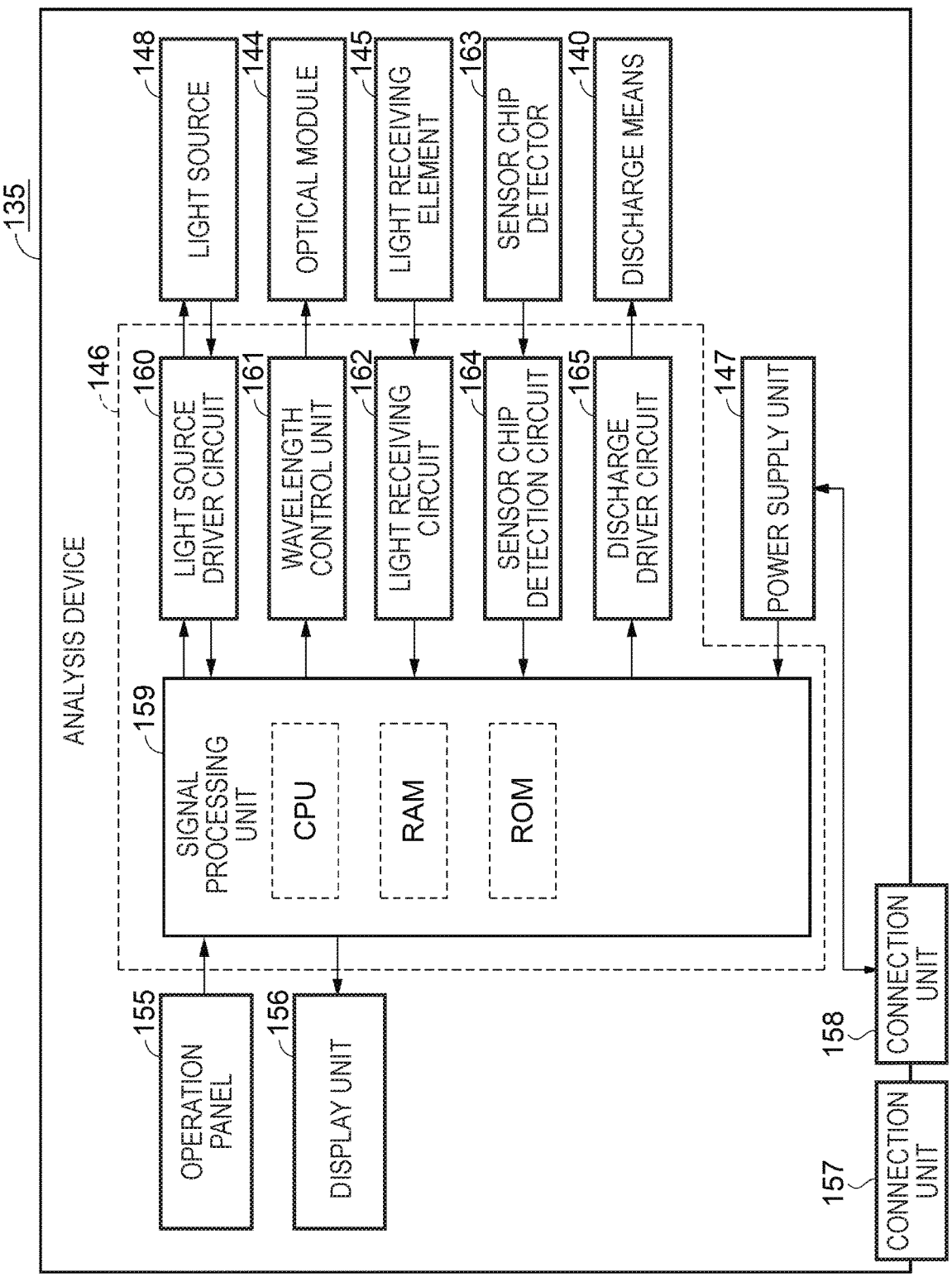
FIG. 29 is a block diagram illustrating a configuration of a control system of the gas detection apparatus.

FIG. 28 is a schematic front view illustrating a configuration of a gas detection apparatus, and FIG. 29 is a block diagram illustrating a configuration of a control system of the gas detection apparatus. As illustrated in FIG. 28, a gas detection apparatus 135 as an electronic apparatus has a configuration in which a sensor chip 136, a flow path 137 including a suction port 137a, a suction flow path 137b, a discharge flow path 137c, and a discharge port 137d, and a main body unit 138 are included.

The main body unit 138 includes a sensor-portion cover 139, a discharge unit 140, and a casing 141. It is possible to attach and detach the flow path 137 by opening and closing the sensor-portion cover 139. Furthermore, the main body unit 138 includes a detection apparatus including an optical unit 142, a filter 143, an optical module 144, a light receiving element 145 (detection unit), and the like. As the optical module 144, anyone of the optical module 1, the optical module 38, and the optical module 42 described above is used.

Furthermore, the main body unit 138 includes a control unit 146 (processing unit) that processes a detected signal and controls the measurement unit, and a power supply unit 147 that supplies electric power. The optical unit 142 is configured with a light source 148 that emits light 21, a beam splitter 149, a lens 150, a lens 151, and a lens 152. The beam splitter 149 reflects light 21 incident from the light source 148 toward the sensor chip 136 side and transmits light 21 incident from the sensor chip side to the light receiving element 145 side.

As illustrated in FIG. 29, in the gas detection apparatus 135, an operation panel 155, a display unit 156, a connection unit 157 for interfacing with the outside, and the power supply unit 147 are provided. In a case where the power supply unit 147 is a secondary battery, a connection unit 158 for charging may be provided. Furthermore, the control unit 146 of the gas detection apparatus 135 includes a signal processing unit 159 configured with a CPU and the like, and a light source driver circuit 160 for controlling the light source 148. Furthermore, the control unit 146 includes a wavelength control unit 161 as a control unit for controlling the optical module 144, and a light receiving circuit 162 for receiving a signal from the light receiving device 145. The wavelength control unit 161 controls the optical module 144. Furthermore, the control unit 146 includes a sensor chip detection circuit 164 for reading a code of the sensor chip 136 and receiving a signal from a sensor chip detector 163 for detecting the presence or absence of the sensor chip 136. Furthermore, the control unit 146 includes a discharge driver circuit 165 and the like for controlling the discharging unit 140.

Next, an operation of the gas detection apparatus 135 will be described. A sensor chip detector 163 is provided inside the sensor-portion cover 139 on the upper portion of the main body unit 138. The presence or absence of the sensor chip 136 is detected by the sensor chip detector 163. When the detection signal from the sensor chip detector 163 is detected, a signal processing unit 159 determines that the sensor chip 136 is attached. Then, the signal processing unit 159 issues a display signal to the display unit 156 to display that the detection operation can be performed.

Then, the operation panel 155 is operated by the operator and an instruction signal to start detection processing is output from the operation panel 155 to the signal processing unit 159. First, the signal processing unit 159 outputs an instruction signal for driving the light source to the light source driver circuit 160 to operate the light source 148. When the light source 148 is driven, stable linearly polarized laser light is emitted from the light source 148 at a single wavelength. A temperature sensor and a light amount sensor are built in the light source 148, and information on the sensor is output to the signal processing unit 159. When the signal processing unit 159 determines that the light source 148 is operating stably based on a temperature and a light quantity input from the light source 148, the signal processing unit 159 controls the discharge driver circuit 165 to operate the discharge unit 140. With this, a gas sample containing a target material (gas molecule) to be detected is guided from the suction port 137a to the suction flow path 137b, the inside of the sensor chip 136, the discharge flow path 137c, and the discharge port 137d. A dust removing filter 137e is provided in the suction port 137a, and relatively large dust and a portion of water vapor and the like are removed.

The sensor chip 136 is an element incorporating a plurality of metal nanostructures and is a sensor utilizing localized surface plasmon resonance. In such a sensor chip 136, an enhanced electric field is formed between the metal nanostructures by laser light. When gas molecules enter the enhanced electric field, Raman scattered light including information on molecular vibration and Rayleigh scattered light are generated. These Rayleigh scattered light and Raman scattered light are incident onto the filter 143 through the optical unit 142. The Rayleigh scattered light is separated by the filter 143, and the Raman scattered light is incident onto the optical module 144.

Then, the signal processing unit 159 outputs a control signal to the wavelength control unit 161. With this, the wavelength control unit 161 drives the actuator of an optical module 144 to cause the optical module 144 to spectrally separate the Raman scattered light corresponding to the gas molecules to be detected. When the spectrally separated light 21 is received by the light receiving element 145, a light reception signal corresponding to the amount of received light is output to the signal processing section 159 via the light receiving circuit 162.

The signal processing unit 159 compares spectral data of the Raman scattered light corresponding to the obtained gas molecule to be detected with data stored in the ROM. Then, it is determined whether or not the gas molecule to be detected is a target gas molecule, and a material is specified. The signal processing unit 159 displays the result information on the display unit 156 and outputs the result information from the connection unit 157 to the outside.

The gas detection apparatus 135 for spectrally separating the Raman scattered light by the optical module 144 and performing gas detection from the spectrally separated Raman scattered light is exemplified. The gas detection apparatus 135 may be used as a gas detection apparatus that measures gas specific absorbance and specifies a gas type. In this case, the optical module 144 is used as a gas sensor for allowing gas to flow into the sensor and detecting light 21 absorbed by the gas among the incident light. The gas detection apparatus is an electronic apparatus that analyzes and discriminates the gas flowing into the sensor by the gas sensor. The gas detection apparatus 135 is configured to have such a configuration so as to make it possible to detect a gas component using the optical module 144.

The gas detection apparatus 135 includes the optical module 144 and the wavelength control unit 161 for controlling the optical module 144. The wavelength control unit 161 controls the optical module 144 to control the wavelength of light 21 that the optical module 144 passes. In the optical module 144, any one of the optical module 1, the optical module 38, and the optical module 42 described above is used. Accordingly, the optical module 144 is a module capable of suppressing degradation of optical characteristics. As a result, the gas detection apparatus 135 can be an apparatus provided with a module capable of suppressing degradation of the optical characteristics.

Sixth Embodiment

Next, an embodiment of a food analysis device including any one of the optical module 1, the optical module 38, and the optical module 42 described above will be described with reference to FIG. 30. The optical module 1, the optical module 38, or the optical module 42 described above can be used for a material component analysis apparatus such as a non-invasive measuring device of saccharides by near-infrared spectroscopy or a non-invasive measuring apparatus of information on foods, living bodies, minerals, and the like. The food analysis device is one type of material component analysis apparatus. Description of the same points as the embodiments described above will be omitted.

Figure 30:
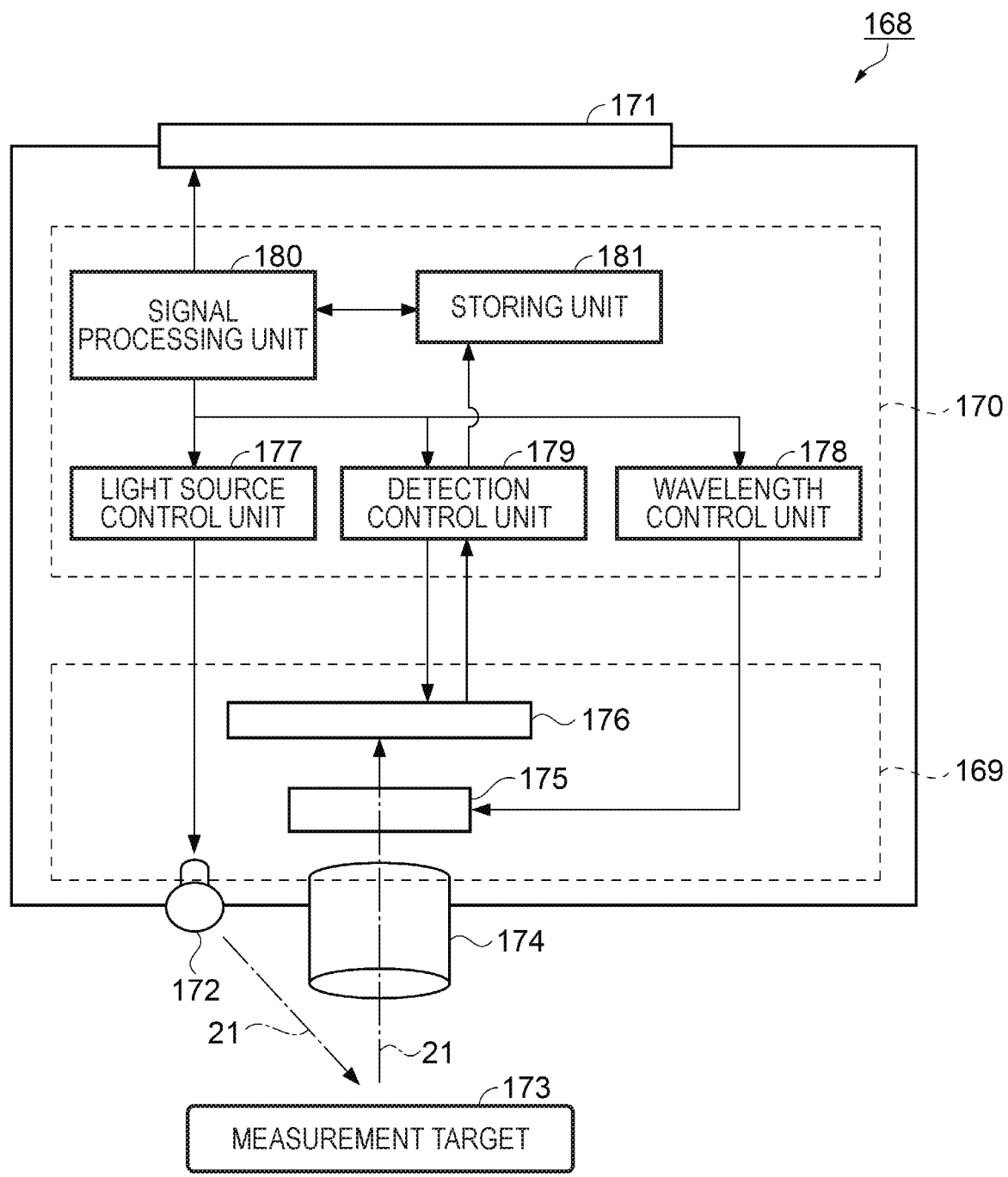
FIG. 30 is a block diagram illustrating a configuration of a food analysis device according to a sixth embodiment.

FIG. 30 is a block diagram illustrating a configuration of a food analysis device. As illustrated in FIG. 30, a food analysis device 168 as an electronic apparatus includes a detector 169, a control unit 170, and a display unit 171. The detector 169 includes a light source 172 that emits light 21, an image forming lens 174 into which light 21 from a measurement target 173 is introduced, and an optical module 175 that spectrally separates light 21 introduced from the image forming lens 174. As the optical module 175, any one of the optical module 1, the optical module 38, and the optical module 42 described above is used. Furthermore, the detector 169 includes an imaging unit 176 (detection unit) for detecting the spectrally separated light.

The control unit 170 includes a light source control unit 177 that performs lighting-ON and lighting-OFF control of the light source 172, a brightness control during lighting-ON, and a wavelength control unit 178 as a control unit for controlling the optical module 175. The wavelength control unit 178 controls the optical module 175. Furthermore, the control unit 170 includes a detection control unit 179 that controls the imaging unit 176 to acquire a spectral image captured by the imaging unit 176, a signal processing unit 180, and a storing unit 181.

When the food analysis device 168 is driven, the light source 172 is controlled by the light source control unit 177 and light 21 is irradiated from the light source 172 to the measurement target 173. Then, light 21 reflected by the measurement target 173 incidents onto the optical module 175 through the image forming lens 174. The optical module 175 is driven under control of the wavelength control unit 178. With this, it is possible to extract light of a targeted wavelength from the optical module 175 with high accuracy. Then, the extracted light 21 is captured by an imaging unit 176 configured by, for example, a CCD camera or the like. The captured light 21 is accumulated in the storing unit 181 as a spectral image. The signal processing unit 180 controls the wavelength control unit 178 to change a value of voltage to be applied to the optical module 175, and acquires a spectral image for each wavelength.

Then, the signal processing unit 180 performs arithmetic processing on data of each pixel in each image accumulated in the storing unit 181, and obtains the spectrum at each pixel. In the storing unit 181, information on the component of food with respect to the spectrum is stored. Based on information on the food stored in the storing unit 181, the signal processing unit 180 analyzes data of the obtained spectrum. Then, the signal processing unit 180 obtains the food components contained in the measurement target 173 and each food component content thereof. The signal processing unit 180 can also calculate food calorie, freshness, and the like from the obtained food component and content. Furthermore, the signal processing unit 180 can also perform extraction and the like of a portion where freshness is decreased among the foods to be examined, by analyzing spectrum distribution in the image. Furthermore, the signal processing unit 180 can also perform detection of foreign matter and the like contained in food. Then, the signal processing unit 180 performs processing of causing the display unit 171 to display information such as ingredients, contents, calories, freshness, and the like of food to be examined obtained as described above.

The food analysis device 168 includes the optical module 175 and the wavelength control unit 178 for controlling the optical module 175. The wavelength control unit 178 controls the optical module 175 to control the wavelength of light 21 that the optical module 175 passes. In the optical module 175, the optical module 1, the optical module 38, or the optical module 42 described above is used. Accordingly, the optical module 175 is a module capable of suppressing degradation of optical characteristics. As a result, the food analysis device 168 can be an apparatus provided with a module capable of suppressing degradation of optical characteristics.

In addition to the food analysis device 168, it is also possible to utilize the food analysis device 168 as a non-invasive measurement apparatus of other information as described above by adopting substantially the same configuration. For example, the food analysis device 168 can be used as a biological analysis apparatus for analyzing biological components such as measurement and analysis of body fluid component such as blood. As such a biological analysis apparatus, for example, the food analysis device 168 can be used for an apparatus for measuring a body fluid component such as blood. Besides, if the food analysis device 168 is an apparatus for detecting ethyl alcohol, the food analysis device 168 can be used for a drunk driving prevention apparatus for detecting a driver's drinking state. Further, the food analysis device 168 can be used as an electronic endoscope system including such a biological analysis apparatus. Furthermore, the food analysis device 168 can also be used as a mineral analysis apparatus for performing component analysis of minerals.

Furthermore, the electronic apparatus using the optical module 1, the optical module 38, or the optical module 42 described above can be applied to the following apparatuses. For example, it is also possible to transmit data with light of each wavelength by changing intensity of light of each wavelength with time, and in this case, light of a specific wavelength is spectrally separated by the optical module 1, the optical module 38 or the optical module 42 described above. It is possible to extract data transmitted with the light of the specific wavelength by receiving light by a light receiving unit, and it is also possible to perform optical communication of a plurality of wavelengths by processing data of light of each wavelength by the electronic apparatus that extracts data by the optical module 1, the optical module 38, or the optical module 42 as described above. Also, in this case, the electric apparatus can be an apparatus provided with a module capable of suppressing degradation of optical characteristics.

Seventh Embodiment

Next, an embodiment of a spectroscopic camera including the optical module 1 described above will be described with reference to FIG. 31. The optical module 1, the optical module 38, or the optical module 42 described above can be used for a spectroscopic camera that spectrally separates light 21 to capture a spectral image, a spectroscopic analyzer, or the like. As an example of such a spectroscopic camera, an infrared camera in which the optical module 1, the optical module 38 or the optical module 42 is built may be included. Description of the same points as the embodiments described above will be omitted.

Figure 31:
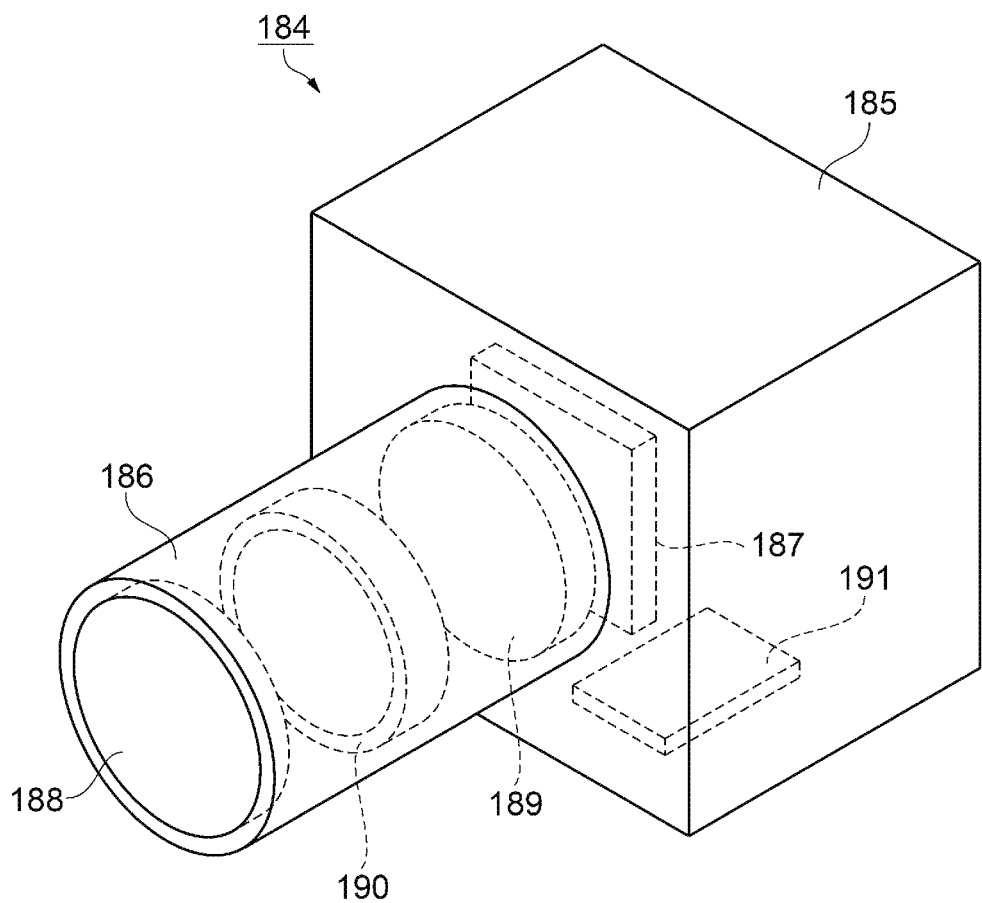
FIG. 31 is a schematic perspective view illustrating a configuration of a spectroscopic camera according to a seventh embodiment.

FIG. 31 is a schematic perspective view illustrating a configuration of a spectroscopic camera. As illustrated in FIG. 31, the spectroscopic camera 184 as an electronic apparatus includes a camera main body 185, an imaging lens unit 186, and an imaging unit 187. The camera body 185 is a portion which is grasped and operated by an operator.

The imaging lens unit 186 is connected to the camera main body 185 and guides incident image light to the imaging unit 187. The imaging lens unit 186 is configured to include an objective lens 188, an image forming lens 189, and an optical module 190 provided between these lenses. As the optical module 190, any one of the optical module 1, the optical module 38, and the optical module 42 described above is used. Furthermore, a wavelength control unit 191 as a control unit for controlling the wavelength of light to be spectrally separated by the optical module 190 is provided in the camera main body 185. The wavelength control unit 191 controls the optical module 190.

The imaging unit 187 is configured with a light receiving element, and images image light guided by the imaging lens unit 186. In the spectroscopic camera 184, the optical module 190 transmits light of a wavelength to be captured, and the imaging unit 187 captures a spectral image of light of a desired wavelength.

The spectroscopic camera 184 includes the optical module 190 and the wavelength control unit 191 for controlling the optical module 190. The wavelength control unit 191 controls the optical module 190 to control the wavelength of light 21 that the optical module 190 passes. In the optical module 190, any one of the optical module 1, the optical module 38, and the optical module 42 described above is used. Accordingly, the optical module 190 is a module capable of suppressing degradation of optical characteristics. As a result, the spectroscopic camera 184 can be an apparatus provided with a module capable of suppressing degradation of optical characteristics.

Furthermore, an optical module combining the optical module 190 may be used as a band pass filter. For example, it can also be used as an optical laser device that spectrally separates and transmits only light in a narrow band centering on a predetermined wavelength among light in a predetermined wavelength range emitted from the light emitting element by the optical module 190. Furthermore, the optical module may be used as a biological authentication apparatus, for example, the optical module can also be applied to an apparatus for authenticating a blood vessel, a fingerprint, a retina, an iris, and the like using light in a near-infrared region or a visible region. Furthermore, the optical module can be used for a concentration detection apparatus. In this case, infrared energy (infrared light) emitted from a material is spectrally separated and analyzed and concentration of a subject in the sample is measured by the optical module 1.

As described above, the optical module 1, the optical module 38, or the optical module 42 described above can also be applied to any apparatus that spectrally separates predetermined light from incident light. As described above, the optical module 1, the optical module 38, or the optical module 42 described above can efficiently spectrally separates a plurality of wavelengths. For that reason, it is possible to efficiently perform measurement of spectra of a plurality of wavelengths and detection of a plurality of components. Accordingly, as compared with an apparatus in the related art that extracts a desired wavelength by a plurality of optical modules that spectrally separates a single wavelength, it is possible to promote miniaturization of the electronic apparatus, for example and it can be suitably used as a portable or on-vehicle optical apparatus. Also, in this case, since the optical module 1, the optical module 38 or the optical module 42 described above can suppress passage of light 21 having a wavelength other than the specific wavelength, an electronic apparatus using these optical modules can extract and utilize light of a plurality of wavelengths with high accuracy. For example, these optical modules can be used for a colorimeter, a spectroscope, a hyperspectral camera, an image forming apparatus with built-in colorimeter, optical sensor applied medical instrument, optical communication equipment, laser modulator, and the like.

The seventh embodiment is not limited to the embodiments described above, and various modifications and improvements may be made thereto by a person having ordinary skill in the art within the technical idea of the invention is there. A modification example will be described below.

Modification Example 1

In the first embodiment, the surface of the first reflective film 14 on the side of the substrate 13 is also covered with the first protective film 16. It may be omitted to provide the first protective film 16 at a place of contact with the substrate 13 in the first reflective film 14. Also, in this case, the first reflective film 14 is not exposed. Accordingly, the first protective film 16 can cover the first reflective film 14 so as not to be exposed. This content can also be applied to the second embodiment and the third embodiment.

Modification Example 2

In the first embodiment, the first protective film and the second protective film 24 are formed of the conductive film. The first protective film 16 and the second protective film 24 may be formed as films having no conductivity. For example, the first protective film 16 and the second protective film 24 may be formed of a resin film having optical transparency. In this case, the first electrode terminal 15a is provided to be connected to the first reflective film 14 and the second electrode terminal 22a is provided to be connected to the second reflective film 18. With this, wirings can be provided in the first reflective film 14 and the second reflective film 18.

Modification Example 3

In the first embodiment, the gold wire 11 was used for the wiring between the first electrode terminal 15a and the first intermediate electrode 5a. The gold wire 11 was also used for the wiring between the second electrode terminal 22a and the second intermediate electrode 6a. Instead of the gold wire 11, a flexible printed circuit (FPC) may be used. When a large number of the first reflective film 14 and the second reflective film 18 are provided on the substrate 13, the number of terminals also increases. In this case, by using the FPC, the wiring can be provided with good productivity.

Modification Example 4

In the second embodiment, the surface of the second reflective film 18 on the side of the shape maintaining film 40 is also covered with the second protective film 24. When it is difficult for the shape maintaining film 40 to change with time, it may be omitted to provide the second protective film 24 at a place of contact with the shape maintaining film 40 in the second reflective film 18. Also, in this case, the second reflective film 18 is not exposed. Accordingly, the second protective film 24 can cover the second reflective film 18 so as not to be exposed.

Modification Example 5

In the third embodiment, the conductive reflective film 49 is supported by the supporting portion 17. Similarly as in the second embodiment, the shape maintaining film 40 may be provided so as to overlap the conductive reflective film 49. In this case, the second reflective film 50 and the second electrode 51 may be separated. Then, the first reflective film 45 and the first electrode 46 may be connected. A structure that is easy to manufacture can be selected.

Modification Example 6

In the first embodiment, the first electrode terminal 15a is provided on the first protective film 16, and the gold wire 11 is provided on the first electrode terminal 15a. When the gold wire 11 can be provided on the first protective film 16, it may be omitted to provide the first electrode terminal 15a. Similarly, when the gold wire 11 can be provided on the second protective film 24, it may be omitted to provide the second electrode terminal 22a. This content can also be applied to the second embodiment.

Also, in the third embodiment, when the gold wire 11 can be provided on the third protective film 47, it may be omitted to provide the third electrode terminal 45a. Similarly, when the gold wire 11 can be provided on the fourth protective film 48, it may be omitted to provide the first electrode terminal 46a. When the gold wire 11 can be provided on the fifth protective film 52, it may be omitted to provide the second electrode terminal 49b. Since a step of providing the terminal can be eliminated, the optical module 1, the optical module 38, and the optical module 42 can be manufactured with high productivity.

The entire disclosure of Japanese Patent Application No. 2017-166545 filed Aug. 31, 2017 is expressly incorporated herein by reference.

What is claimed is:

1. A wavelength tunable optical filter comprising:
   a substrate;
   a first encased reflective film provided on the substrate, the first encased reflective film including a first reflective film and a first protective film entirely encasing the first reflective film;
   a second encased reflective film, the second encased reflective film including a second reflective film and a second protective film entirely encasing the second reflective film, the second reflective film facing the first reflective film, and
   a supporting portion provided over the substrate, the supporting portion supporting the second encased reflective film at a predetermined distance from the first encased reflective film, the supporting portion having an inner circumferential wall defining a cylindrical interior space between the first encased reflective film and the second encased reflective film;
   wherein the second encased reflective film has a plurality of through-holes collectively forming a circular array by being disposed along a circumference of a circle in a plan view of the second encased reflective film, a center of the circular array and a center of the cylindrical interior space are concentric in the plan view, and
   wherein for every through-hole of the circular array of the second encased reflective film, a distance from the corresponding through-hole to the inner circumferential wall of the supporting portion along a corresponding line segment passing through both (i) the center of the circular array and (ii) the corresponding through-hole is equal to or greater than a diameter of the circular array.

2. The wavelength tunable optical filter according to claim 1,
wherein each of the first reflective film and the second reflective film is a metal film.

3. The wavelength tunable optical filter according to claim 2,
wherein each of the first reflective film and the second reflective film is an Ag film or an Ag alloy film.

4. An optical module comprising:
the wavelength tunable optical filter according to claim 3; and
a casing having an internal space and accommodating the wavelength tunable optical filter in the internal space.

5. An electronic apparatus comprising:
the optical module according to claim 4; and
a control unit that controls the optical module.

6. An optical module comprising:
the wavelength tunable optical filter according to claim 2; and
a casing having an internal space and accommodating the wavelength tunable optical filter in the internal space.

7. An electronic apparatus comprising:
the optical module according to claim 6; and
a control unit that controls the optical module.

8. The wavelength tunable optical filter according to claim 1,
wherein each of the first protective film and the second protective film is a conductive film.

9. The wavelength tunable optical filter according to claim 8,
wherein the first protective film and the second protective film transmit light.

10. An optical module comprising:
the wavelength tunable optical filter according to claim 8; and
a casing having an internal space and accommodating the wavelength tunable optical filter in the internal space.

11. An electronic apparatus comprising:
the optical module according to claim 10; and
a control unit that controls the optical module.

12. The wavelength tunable optical filter according to claim 1, further comprising:
a shape maintaining film overlapping the second reflective film.

13. The wavelength tunable optical filter according to claim 1,
wherein a surface of each through-hole is protected with the second protective film so as not to be exposed.

14. The wavelength tunable optical filter according to claim 1,
wherein a thickness of each of the first reflective film and the second reflective film is 10 nm or more and 80 nm or less.

15. The wavelength tunable optical filter according to claim 1,
wherein a material of the supporting portion is silicon oxide or a resin material.

16. The wavelength tunable optical filter according to claim 1, further comprising:
an actuator having a first electrode provided on the substrate and a second electrode supported by the supporting portion,
wherein the first reflective film also functions as the first electrode and the second reflective film also functions as the second electrode.

17. The wavelength tunable optical filter according to claim 1, further comprising:
an actuator having a first electrode provided on the substrate and a second electrode supported by the supporting portion,
wherein, when a distance between the first reflective film and the second reflective film is defined as an inter-reflective film distance and a distance between the first electrode and the second electrode is defined as an inter-electrode distance, the inter-electrode distance is longer than the inter-reflective film distance.

18. The wavelength tunable optical filter according to claim 17,
wherein the second reflective film is connected to the second electrode,
the first reflective film is separated from the first electrode,
a voltage between the first electrode and the second electrode is controlled, and
an electric capacitance between the first reflective film and the second reflective film is measured.

19. An optical module comprising:
the wavelength tunable optical filter according to claim 1; and
a casing having an internal space and accommodating the wavelength tunable optical filter in the internal space.

20. An electronic apparatus comprising:
the optical module according to claim 19; and
a control unit that controls the optical module.

* * * * *